United States Patent
Motohashi et al.

(10) Patent No.: US 9,663,688 B2
(45) Date of Patent: May 30, 2017

(54) OPTICAL MEMBER AND ULTRAVIOLET-CURABLE ADHESIVE TO BE USED FOR PRODUCING THE SAME

(71) Applicant: Nippon Kayaku KabushikiKaisha, Chiyoda-ku (JP)

(72) Inventors: Hayato Motohashi, Tokyo (JP); Daisuke Kobayashi, Tokyo (JP); Yuichiro Matsuo, Tokyo (JP); Takaaki Kurata, Tokyo (JP); Masahiro Naitou, Tokyo (JP)

(73) Assignee: NipponKayaku KabushikiKaisha, Tokyo (JP)

( * ) Notice: Subject to any disclaimer, the term of this patent is extended or adjusted under 35 U.S.C. 154(b) by 463 days.

(21) Appl. No.: 14/386,147

(22) PCT Filed: Oct. 25, 2012

(86) PCT No.: PCT/JP2012/006834
§ 371 (c)(1),
(2) Date: Sep. 18, 2014

(87) PCT Pub. No.: WO2013/140472
PCT Pub. Date: Sep. 26, 2013

(65) Prior Publication Data
US 2015/0044479 A1     Feb. 12, 2015

(30) Foreign Application Priority Data

Mar. 21, 2012 (JP) .................. 2012-062989
Mar. 21, 2012 (JP) .................. 2012-062990

(51) Int. Cl.
| | |
|---|---|
| C09J 151/00 | (2006.01) |
| C09J 151/06 | (2006.01) |
| B32B 37/12 | (2006.01) |
| G02B 1/04 | (2006.01) |
| C09J 151/08 | (2006.01) |

(52) U.S. Cl.
CPC ........... *C09J 151/003* (2013.01); *B32B 37/12* (2013.01); *C09J 151/08* (2013.01); *B32B 2037/1253* (2013.01); *B32B 2307/412* (2013.01); *B32B 2310/0831* (2013.01); *B32B 2315/08* (2013.01); *B32B 2457/20* (2013.01); *G02B 1/04* (2013.01); *Y10T 428/31551* (2015.04); *Y10T 428/31931* (2015.04)

(58) Field of Classification Search
None
See application file for complete search history.

(56) References Cited

U.S. PATENT DOCUMENTS

| | | |
|---|---|---|
| 4,452,720 A | 6/1984 | Harada et al. |
| 6,294,239 B1 * | 9/2001 | Tokuda ............... C08F 290/067 264/494 |
| 2006/0108050 A1 | 5/2006 | Satake et al. |
| 2009/0117378 A1 | 5/2009 | Hu et al. |
| 2011/0105637 A1 | 5/2011 | Fujita et al. |
| 2014/0320770 A1 | 10/2014 | Motohashi et al. |
| 2014/0356591 A1 | 12/2014 | Motohashi et al. |

FOREIGN PATENT DOCUMENTS

| | | |
|---|---|---|
| CN | 1152330 A | 6/1997 |
| CN | 101663602 A | 3/2010 |
| EP | 0041274 B1 | 3/1984 |
| JP | 57-189 A | 1/1982 |
| JP | 2005-263987 A | 9/2005 |
| JP | 2007-156184 A | 6/2007 |
| JP | 2009-186954 A | 8/2009 |
| JP | 2009-192792 A | 8/2009 |
| JP | 4711354 B2 | 6/2011 |
| TW | 201002796 A | 1/2010 |
| TW | 201033311 A | 9/2010 |
| TW | 201311844 A | 3/2013 |
| WO | 2010/027041 A1 | 3/2010 |

OTHER PUBLICATIONS

Office action mailed Sep. 15, 2016 in co-pending U.S. Appl. No. 14/371,536.
Taiwanese communication, with English translation, dated Jul. 15, 2015 in corresponding Taiwanese patent application No. 101140241.
International Search Report and Written Opinion mailed Jan. 29, 2013 in corresponding PCT application No. PCT/JP2012/006834.
International Preliminary Report on Patentability mailed Oct. 2, 2014 in corresponding PCT application No. PCT/JP2012/006834.
International Search Report mailed Jan. 29, 2013 in co-pending PCT application No. PCT/JP2012/006833.
Written Opinion mailed Jan. 13, 2013 in co-pending PCT application No. PCT/JP2012/006833.
International Preliminary Report on Patentability mailed Jul. 24, 2014 in co-pending PCT application No. PCT/JP2012/006833.

(Continued)

*Primary Examiner* — Sheeba Ahmed
(74) *Attorney, Agent, or Firm* — Nields, Lemack & Frame, LLC

(57) ABSTRACT

The present invention relates to an ultraviolet-curable adhesive to be used for laminating a first optical base material and a second optical base material having a light-shielding portion on a surface thereof to each other, the ultraviolet-curable adhesive containing (A) a specified compound represented by the following formula (1), (B) a photopolymerizable compound, and (C) a photopolymerization initiator; a cured product obtained by irradiating the adhesive with an ultraviolet ray; and an optical member having the cured product, such as a touch panel:

(1)

$$\left[ R_1 - \!\!\bigcirc\!\! - X \right]_{t2} \!\! \overset{O}{\underset{N-N}{\diagdown\!\!\!\diagup}} \!\! \left[ X - \!\!\bigcirc\!\!-\!\!\bigcirc\!\! {}_Y {}_Y \right]_{t1}$$

33 Claims, 1 Drawing Sheet

(56) References Cited

OTHER PUBLICATIONS

Taiwanese communication, with English translation, dated Aug. 6, 2015 in co-pending Taiwanese patent application No. 101140239.
Japanese communication, with English translation, dated Nov. 30, 2015 in co-pending Japanese patent application No. 2013-553098.
International Search Report and Written Opinion mailed Jan. 29, 2013 in co-pending PCT application No. PCT/JP2012/006836.
International Preliminary Report on Patentability mailed Jul. 24, 2014 in co-pending PCT application No. PCT/JP2012/006836.
Chinese communication, with English translation, issued Jul. 1, 2015 in co-pending Chinese patent application No. 201280067011.0.
Taiwanese communication, with English translation, dated Aug. 13, 2015 in co-pending Taiwanese patent application No. 101140244.
Japanese communication, with English translation, dated Nov. 30, 2015 in co-pending Japanese patent application No. 2013-553099.
Office action mailed Dec. 1, 2015 in co-pending U.S. Appl. No. 14/371,545.
Office action mailed May 18, 2016 in co-pending U.S. Appl. No. 14/371,545.

\* cited by examiner (a)

(b)

OPTICAL MEMBER AND ULTRAVIOLET-CURABLE ADHESIVE TO BE USED FOR PRODUCING THE SAME

TECHNICAL FIELD

The present invention relates to an ultraviolet-curable resin composition which is useful for laminating optical base materials.

BACKGROUND ART

In recent years, in display devices such as liquid crystal displays, plasma displays, organic EL displays, etc., a touch panel in which a position input device, for example, a touch input device is combined with a display device is being widely utilized. This touch panel has a structure in which a display unit is laminated with a touch sensor unit in which a glass plate or a resin-made film having a transparent electrode formed thereon and a glass- or resin-made transparent protective plate are laminated to each other.

In the touch panel, as a method for laminating a display unit with a glass plate or film having a transparent electrode formed thereon and an optical base material such as a glass- or resin-made transparent protective plate, etc., there is a technique using a pressure sensitive adhesive double coated sheet. However, in using a pressure sensitive adhesive double coated sheet, there was involved such a problem that an air bubble is easily entrained. As a technique substituting for the pressure sensitive adhesive double coated sheet, there is proposed a technique for laminating them with a flexible ultraviolet-curable resin composition.

As in an example of the touch panel, in display devices such as liquid crystal display devices, etc., there is proposed a structure in which a display unit, a glass plate having a transparent electrode formed thereon, and an optical base material such as a glass-made or resin-made transparent protective plate are laminated to each other.

In the transparent protective plate of a display device having the above-described structure, a stripe-like light-shielding portion is formed in an outermost edge for the purpose of enhancing a contrast of a displayed image. In the case where the transparent protective plate or the touch sensor unit provided with a transparent plate is laminated with other optical member, for example, a glass plate having a transparent electrode formed thereon or a display unit, with an ultraviolet-curable resin composition, a sufficient ultraviolet ray does not reach a light-shielding area of the ultraviolet-curable resin that becomes a shade of the light-shielding portion by the light-shielding portion, so that curing of the resin in the light-shielding area becomes insufficient. If curing of the resin is insufficient, a problem such as uneven display in the displayed image in the vicinity of the instant light-shielding portion, etc. is generated.

As a technique for enhancing curing of the resin in the light-shielding area, Patent Document 1 discloses a technique in which an organic peroxide is contained in an ultraviolet-curable resin, and after irradiation with an ultraviolet ray, the resultant is heated to cure the resin in a light-shielding area. However, there is a concern that a heating step damages a liquid crystal display device or the like. Furthermore, since a time of 60 minutes or more is required for thoroughly curing the resin by heating, there was involved such a problem that productivity is poor. In addition, Patent Document 2 discloses a technique in which an ultraviolet ray is irradiated from the side of an outer side face of the surface on which a light-shielding portion is formed, thereby curing a resin in a light-shielding area. However, since it is difficult to irradiate an ultraviolet ray from the side face depending upon a shape of a liquid crystal display device, the shape of the liquid crystal display device to which the instant method is applicable was limited.

Then, as for the ultraviolet-curable resin which is used for laminating an optical base material having a light-shielding portion, an ultraviolet-curable resin capable of achieving thorough curing with an ultraviolet ray from one direction even in the light-shielding area in which the ultraviolet ray is shielded by the light-shielding portion was demanded to be developed.

CITED REFERENCE

Patent Documents

Patent Document 1: Japanese Patent No. 4711354
Patent Document 2: JP-A-2009-186954

SUMMARY OF THE INVENTION

Problem that the Invention is to Solve

In view of such problems of the conventional techniques, the present invention has been made, and its object is to provide an ultraviolet-curable adhesive which in laminating an optical base material such as a transparent protective plate, etc. with an ultraviolet-curable adhesive, eves in the case where a light-shielding portion is formed in the optical base material, is capable of thoroughly curing a resin positioned in a light-shielding area where the light is shielded by the presence of the light-shielding portion by irradiation with an ultraviolet ray from one direction without damaging a liquid display device or the like.

Means for Solving the Problems

In order to solve the above-described problems, the present inventors made extensive and intensive investigations. As a result, it has been found that the above-described problems can be solved by allowing a specified compound represented by the following formula (1) to coexist in an ultraviolet-curable adhesive, leading to accomplishment of the present invention. Specifically, the present invention relates to the following (1) to (33).

(1) An optical member comprising an optical base material and an optical base material having a light-shielding portion on a surface thereof, the optical base materials being adhered to each other via a cured product layer made of an ultraviolet-curable adhesive containing (A) a compound represented by the following formula (1), (B) a photopolymerizable compound, and (C) a photopolymerization initiator:

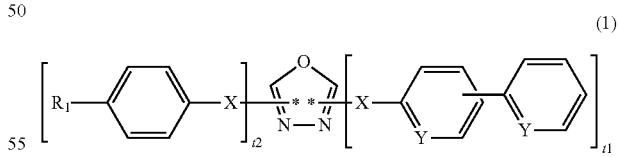

(1)

wherein $R_1$ represents an alkyl group having from 1 to 4 carbon atoms; X represents a direct bond or a coupling group represented by the following formula (2):

(2)

Y represents CH or a nitrogen atom; Z represents a phenylene group, a bipyridine residue, or a fluorene residue; each of t1 and t2 represents an integer of from 0 to 2, provided that t1 and t2 are not 0 at the same time; * represents a coupling site; the coupling site in the formula (1) is bonded to a carbon atom of the oxadiazole skeleton; and in the coupling sites in the formula (2), the left end is bonded to the oxadiazole skeleton, and the right end is bonded to the benzene skeleton or the pyridine skeleton.

(2) The optical member described in (1) above, wherein in the compound (A) represented by the formula (1), both t1 and t2 are 1, or one of Xs is a direct bond, with the other being a coupling group represented by the formula (2), and t1 is 2, or t2 is 2.

(3) The optical member described in (1) or (2) above, wherein in the compound (A) represented by the formula (1), X is a direct bond or a coupling group represented by the formula (2) wherein Z is a phenylene group.

(4) The optical member described in (1) or (2) above, wherein the compound (A) represented by the formula (1) is one in which one of Xs is a direct bond, with the other being a coupling group represented by the formula (2), and t1 is 2, or t2 is 2.

(5) The optical member described in (3) above, wherein the compound (A) represented by the formula (1) is a compound represented by the following formula (3).

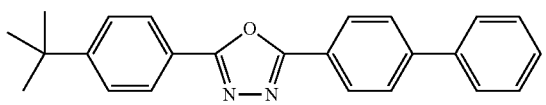

(3)

(6) The optical member described is any one of (1) to (5) above, wherein the compound (A) represented by the formula (1) is a compound which when measured in tetrahydrofuran, has a maximum wavelength of light absorption spectrum in the range of from 270 nm to 320 nm and a maximum wavelength of light emission spectrum in the range of from 350 nm to 400 nm.

(7) The optical member described in any one of (1) to (6) above, wherein an absorption, coefficient per unit weight of the photopolymerization initiator (C) at 365 nm as measured in acetonitrile is from 400 to 10,000 mL/(g·cm).

(8) The optical member described in any one of (1) to (7) above, wherein the ultraviolet-curable adhesive contains, as the photopolymerizable compound (B), (B-1) a (meth) acrylate compound.

(9) The optical member described, in (8) above, wherein the ultraviolet-curable adhesive contains, as the (meth)acrylate compound (B-1), (B-1-1) at least one (meth)acrylate oligomer of any of a urethane (meth)acrylate oligomer and a (meth)acrylate oligomer having at least one skeleton of a polyisoprene skeleton or a polybutadiene skeleton.

(10) The optical member described in (8) or (9) above, wherein the ultraviolet-curable adhesive contains, as the (meth)arylate compound (B-1), (B-1-2) a monofunctional (meth)acrylate monomer.

(11) A touch panel comprising the optical member described in any one of (1) to (10) above.

(12) Use of an ultraviolet-curable adhesive containing (A) a compound represented by the formula (1) described in any one of (1) to (6) above, (8) a photopolymerizable compound, and (C) a photopolymerization initiator, for fabricating an optical member in which an optical base material having a light-shielding portion on a surface thereof and other optical base material are adhered to each other.

(13) An ultraviolet-curable adhesive to be used for laminating an optical base material and an optical base material having a light-shielding portion on a surface thereof to each other, the ultraviolet-curable adhesive containing (A) a compound represented by the following formula (1), (B) a photopolymerizable compound, and (C) a photopolymerization initiator:

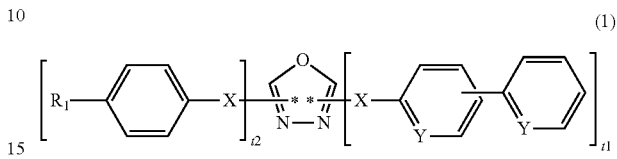

(1)

wherein $R_1$ represents an alkyl group having from 1 to 4 carbon atoms; X represents a direct bond or a coupling group represented by the following formula (2):

(2)

Y represents CH or a nitrogen atom; Z represents a phenylene group, a bipyridine residue, or a fluorene residue; each of t1 and t2 represents an integer of from 0 to 2, provided that t1 and t2 are not 0 at the same time; * represents a coupling site; the coupling site in the formula (1) is bonded to a carbon atom of the oxadiazole skeleton; and in the coupling sites in the formula (2), the left end is bonded to the oxadiazole skeleton, and the right end is bonded to the benzene skeleton or the pyridine skeleton.

(14) The ultraviolet-curable resin composition described in (13) above, wherein in the compound (A) represented by the formula (1), X is a direct bond or a coupling group represented by the formula (2) wherein Z is a phenylene group.

(15) The ultraviolet-curable resin composition described in (13) above, wherein the compound (A) represented by the formula (1) is one in which one of Xs is a direct bond, with the other being a coupling group represented by the formula (2), and t1 is 2, or t2 is 2.

(16) The ultraviolet-curable resin composition described in (13) above, wherein the compound (A) represented by the formula (1) is a compound represented by the following formula (3).

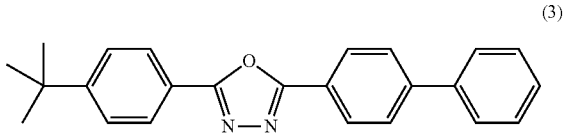 [SMILES: CC(C)(C)c1ccc(-c2nnc(-c3ccc(-c4ccccc4)cc3)o2)cc1]

(3)

(17) The ultraviolet-curable resin composition described in any one of (13) to (16) above, wherein the compound (A) represented by the formula (1) is a compound which when measured in tetrahydrofuran, has a maximum wavelength of light absorption spectrum in the range of from 270 nm to 320 nm and a maximum wavelength of light emission spectrum in the range of from 330 nm to 400 nm.

(18) The ultraviolet-curable adhesive described in any one of (13) to (17) above, wherein an absorption coefficient per unit weight of the photopolymerization initiator (C) at 365 nm as measured in acetonitrile is from 400 to 10,000 mL/(g·cm).
(19) The ultraviolet-curable adhesive described in any one of (13) to (18) above, which contains, as the photopolymerizable compound (B), (B-1) a (meth)acrylate compound.
(20) The ultraviolet-curable adhesive-described in (19) above, which contains, as the (meth)acrylate compound (B-1), (B-1-1) at least one (meth)acrylate oligomer of any of a urethane (meth)acrylate oligomer and a (meth)acrylate oligomer having at least one skeleton of a polyisoprene skeleton or a polybutadiene skeleton.
(21) The ultraviolet-curable adhesive described in (19) or (20) above, which contains, as the (meth)arylate compound (B-1), (B-1-2) a monofunctional (meth)acrylate monomer.
(22) The ultraviolet-curable adhesive described in any one of (13) to (18) above, which contains, as the photopolymerizable compound (B), (i) (B-1-1) at least one (meth)acrylate oligomer of any of a urethane (meth)acrylate oligomer and a (meth)acrylate oligomer having at least one skeleton of a polyisoprene skeleton or a polybutadiene skeleton and (ii) (B-1-2) a monofunctional (meth)acrylate monomer.
(23) The ultraviolet-curable adhesive described in any one of (13) to (22) above, which contains, as the photopolymerizable compound (B), an epoxy compound or an oxetane compound.
(24) The ultraviolet-curable adhesive described in any one of (13) to (23) above, which further contains other components than the compound (A), the photopolymerizable compound (B), and the photopolymerization initiator (C) and has a content of the compound (A) of from 0.001 to 5% by weight and a content of the photopolymerization initiator (C) of from 0.01 to 5% by weight in a total amount of the ultraviolet-curable adhesive, with the remainder being composed of the photopolymerizable compound (B) and other components.
(25) The ultraviolet-curable adhesive described in (24) above, which contains, as the photopolymerizable compound (B), (i) (B-1-1) at least one (meth)acrylate oligomer of any of a urethane (meth)acrylate oligomer and a (meth)acrylate oligomer having at least one skeleton of a polyisoprene skeleton or a polybutadiene skeleton and (ii) (B-1-2) a monofunctional (meth)acrylate monomer and has a content of the (meth)acrylate oligomer (B-1-1) of from 5 to 90% by weight and a content of the monofunctional (meth)acrylate monomer (B-1-2) of from 5 to 90% by weight in a total amount of the ultraviolet-curable adhesive.
(26) The ultraviolet-curable adhesive described in any one of (13) to (23) above, which further contains (D) a softening component, or the ultraviolet-curable adhesive described in (24) or (25) above, which contains, as other component, (D) a softening component.
(27) The ultraviolet-curable adhesive described in (26) above, wherein a content of the softening component (D) is from 10 to 80% by weight relative to a total amount of the ultraviolet-curable adhesive.
(28) The ultraviolet-curable adhesive described in any one of (13) to (27) above, wherein the optical base material and the optical base material having a light-shielding portion, on a surface thereof are used for touch panel.
(29) A cured product obtained by irradiating the ultraviolet-curable adhesive described in any one of (13) to (27) above with an active energy ray.
(30) A method for producing an optical member obtained by laminating an optical base material and an optical base material having the light-shielding portion to each other with the ultraviolet-curable adhesive described in any one of (13) to (27) above and then curing the ultraviolet-curable adhesive by irradiating an active energy ray through the optical base material having the light-shielding portion.
(31) An ultraviolet-curable adhesive containing (A) a compound represented by the following formula (1):

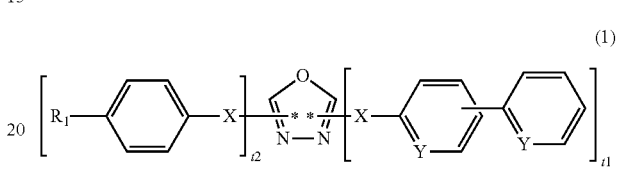

wherein $R_1$ represents an alkyl group having from 1 to 4 carbon atoms; X represents a direct bond or a coupling group represented by the following formula (2):

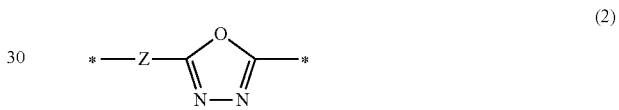

Y represents CH or a nitrogen atom; Z represents a phenylene group, a bipyridine residue, or fluorene residue; each of t1 and t2 represents an integer of from 0 to 2, provided that t1 and t2 are not 0 at the same time; * represents a coupling site; the coupling site in the formula (1) is bonded to a carbon atom of the oxadiazole skeleton; and in the coupling sites in the formula (2), the left end is bonded to the oxadiazole skeleton, and the right end is bonded to the benzene skeleton or the pyridine skeleton, in a proportion of from 0.01 to 5% by weight in a total amount of the ultraviolet-curable adhesive, with the remainder being composed of ultraviolet-curable adhesive components other than the compound (A).
(32) The ultraviolet-curable adhesive described in (31) above, wherein the compound (A) represented by the formula (1) is at least one compound selected from the group consisting of 2-(4-biphenyl)-5-(4-tert-butylphenyl)-1,3,4-oxadiazole, 1,3-bis[2-(2,2'-bipyridin-6-yl)-1,3, 4-oxadiazo-5-yl]benzene,6,6'-bis[5-(biphenyl-4-yl)-1,3, 4-oxadiazo-2-yl]-2,2'-bipyridyl, and 1,3-bis[2-(4-tert-butylphenyl)-1,3,4-oxadiazo-5-yl]benzene.
(33) The ultraviolet-curable adhesive described in (31) or (32) above, which contains, as the ultraviolet-curable adhesive components other than the compound (A), (B) a photopolymerizable compound, (C) a photopolymerization initiator, and (D) a softening component; and which contains, as the photopolymerizable compound (B), (i) (B-1-1) at least one (meth)acrylate oligomer of any of a urethane (meth)acrylate oligomer and a (meth)acrylate oligomer having at least one skeleton of a polyisoprene skeleton or a polybutadiene skeleton and (ii) (B-1-2) a monofunctional (meth)acrylate monomer, wherein a content of the (meth)acrylate oligomer (B-1-1) is from 5 to 90% by weight, a content of the monofunctional (meth)

acrylate monomer (B-1-2) is from 5 to 70% by weight, a content of the photopolymerization initiator (C) is from 0.01 to 5% by weight, and a content of the softening component (D) is from 10 to 80% by weight in a total amount of the ultraviolet-curable adhesive, the ultraviolet-curable adhesive being used for laminating an optical base material and an optical base material having a light-shielding portion on a surface thereof to each other.

Effect of the Invention

According to the present invention, in laminating an optical base material such as a transparent protective plate, etc. with an ultraviolet-curable adhesive, even in the case where a light-shielding portion is formed in the optical base material, it is possible to thoroughly cure the adhesive positioned in a light-shielding area where the light is shielded by the presence of the light-shielding portion by irradiation with an ultraviolet ray from one direction without damaging a liquid display device or the like. For this reason, even when an obtained optical member is used for a display device, a problem such as uneven display in a displayed image in the vicinity of the light-shielding portion, etc. is not generated.

EMBODIMENTS FOR CARRYING OUT THE INVENTION

Figure 1:
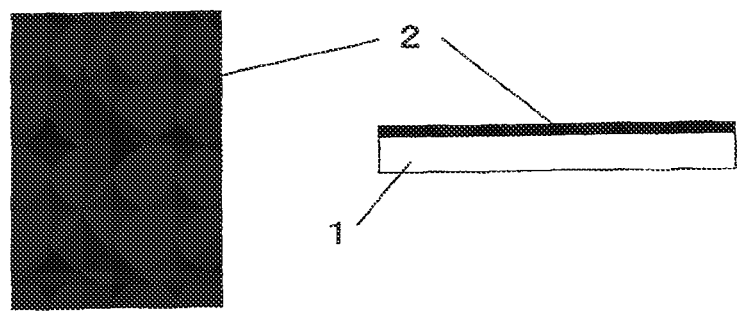
FIG. 1 is a diagrammatic view of an optical base material used during lamination with an ultraviolet-curable adhesive of the present invention in the Examples.
Figure 1:
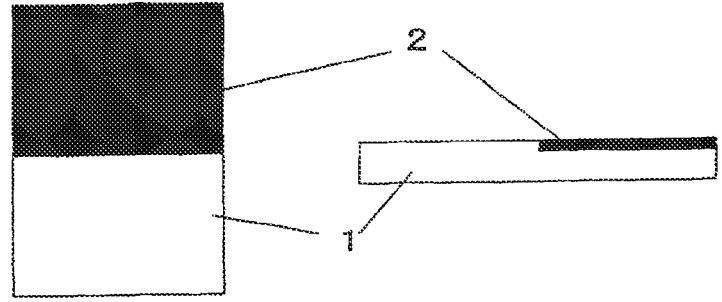

The ultraviolet-curable resin adhesive of the present invention is an ultraviolet-curable adhesive which is used for the purpose of laminating an optical base material and an optical base material having a light-shielding portion to each other and comprises (A) a compound represented by the foregoing formula (1), (B) a photopolymerizable compound, and (C) a photopolymerization initiator.

It is to be noted that in the present specification, the term "(meth)acrylate" means "methacrylate or acrylate". The terms "(meth)acrylic acid" and "(meth)acrylate polymer" and the like are also the same.

The ultraviolet-curable adhesive of the present invention contains (A) a compound represented fey the foregoing formula (1). In the present specification, the compound (A) represented by the foregoing formula (1) is hereinafter also referred to as "compound (A)".

As the compound (A), a compound represented by the following formula (1) can be used.

In the formula (1), $R_1$ represents an alkyl group having from 1 to 4 carbon atoms; X represents a direct bond or a coupling group represented by the following formula (2); and Y represents CH or a nitrogen atom.

In the foregoing formula (2), Z represents a phenylene group, a bipyridine residue, or a fluorine residue. The "bipyridine residue" and the "fluorene residue" represented by Z in the foregoing formula (2) mean a group obtained by eliminating two hydrogen atoms in bipyridine and fluorene, respectively. In the formula (1), each of t1 and t2 represents an integer of from 0 to 2, and t1 and t2 are not 0 at the same time. * in the formulae (1) and (2) represents a coupling site. The coupling site in the formula (1) is bonded to a carbon atom of the oxadiazole skeleton. In the coupling sites in the formula (2), the left end is bonded to the oxadiazole skeleton, and the right end is bonded to the benzene skeleton or the pyridine skeleton (the benzene ring having $R_1$ at the 4-position or the Y-containing 6-membered ring in the formula (1)).

Here, the phenylene group can be represented by the following formula (20) or formula (21); the bipyridine residue can be represented by the following formula (22); and the flourene residue can be represented by the following formula (23).

Formula (20) (Phenylene Group)

(In the formula, each $R_{20}$ independently represents a hydrogen atom or an alkyl group having from 1 to 3 carbon atoms; k10 represents an integer of from 1 to 4; and * represents a coupling site to the foregoing formula (2).)

$R_{20}$ in the formula (20) is preferably a hydrogen atom.

Formula (21) (Phenylene Group)

(21)

(In the formula, each $R_2$ independently represents a hydrogen atom or an alkyl group having from 1 to 3 carbon atoms; k1 represents an integer of from 1 to 4; and * represents a coupling site to the foregoing formula (2).)

$R_2$ in the formula (21) is preferably a hydrogen atom.

Formula (22) (Bipyridine Residue)

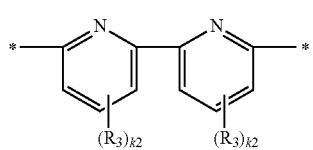

(22)

(In the formula, each $R_3$ independently represents a hydrogen atom or an alkyl group having from 1 to 3 carton atoms; each k2 independently represents an integer of from 1 to 3; and * represents a coupling site to the foregoing formula (2).)

$R_3$ in the formula (22) is preferably a hydrogen atom.

Formula (23) Fluorene Residue)

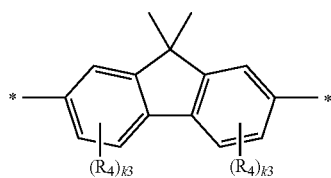

(23)

(In the formula, each $R_4$ independently represents a hydrogen atom or an alkyl group having from 1 to 3 carbon atoms; each k3 represents an integer of from 1 to 3; and * represents a coupling site to the foregoing formula (2).)

$R_4$ in the formula (23) is preferably a hydrogen atom.

X in the compound (A) represented fey the foregoing formula (1) is preferably a direct bond or the coupling group of the foregoing formula (2) wherein Z is a phenylene group or a bipyridine residue. Furthermore, when X is a direct bond or the coupling group of the foregoing formula (2) wherein Z is a phenylene group is preferable from the standpoint that the compound (A) can be easily dissolved in the ultraviolet-curable adhesive at from ordinary temperature (25° C.) to 80° C.

With respect to t1 and t2, a total sum of t1 and t2 is preferably an integer of 1 or 2, and more preferably 2.

In the case where X is a direct bond, a compound wherein both t1 and t2 are 1 is preferable. In addition, in the case where one of Xs is a direct bond, with the other being the coupling group represented by the foregoing formula (2), a compound wherein t is 2, and t2 is 0, or t1 is 0, and t2 is 2 is preferable.

Y in the foregoing formula (1) represents a nitrogen atom or CH and is preferably CH.

In the foregoing formula (1), the group surrounded by the right-side square brackets (the group surrounded by the square brackets to which t1 attaches) is preferably —X-(biphenyl) or —X-(bipyridine), more preferably an —X-(4-biphenyl) or —X-(2,2'-bipyridin-6-yl) group, and especially preferably —X-(4-biphenyl).

Specific examples of $R_1$ include a methyl group, an ethyl group, a propyl group, an isopropyl group, a t-butyl group, and the like. $R_1$ is preferably an alkyl group having a branched chain, and especially preferably a t-butyl group.

In the foregoing formula (1), the number of Xs is coincident with the number of a total sum of t1 and t2 and is 1 or 2. When the total sum of t1 and t2 is 2, it is preferable that one of Xs is a direct bond. When t1 or t2 is 2, it is preferable that one of Xs is a direct bond, with the other being the coupling group represented by the foregoing formula (2), and it is more preferable that the other is the coupling group represented by the foregoing formula (2) wherein Z is a phenylene group or a bipyridine residue.

The following compounds are preferable as the compound (A) represented by the foregoing formula (1).

(i) A compound wherein X is a direct bond, and both t1 and t2 are 1, or one of Xs is a direct bond, with the other being a coupling group represented by the foregoing formula (2), and t1 is 2, and t2 is 0, or t1 is 0 and t2 is 2.

(ii) A compound described above in (i), wherein both t1 and t2 are 1, and all of Xs are a direct bond.

(iii) A compound wherein either one of t1 and t2 is 2, with the other being 0; one of Xs is a direct bond, with the other being the coupling group represented by the foregoing formula (2); and Z is a phenylene group or a bipyridine residue.

(iv) A compound described above in any one of (i) to (iii), wherein all of Ys are CH.

Among the compounds represented by the foregoing formula (1), a compound which when measured in tetrahydrofuran, has a maximum wavelength of light absorption spectrum in the range of from 250 nm to 400 nm and a maximum wavelength of light emission spectrum in the range of from 300 nm to 475 nm is preferable, a compound which has a maximum wavelength of light absorption spectrum in the range of from 250 nm to 350 nm and a maximum wavelength of light emission spectrum in the range of from 330 nm to 420 nm is more preferable, and a compound which has a maximum wavelength of light absorption spectrum in the range of from 270 nm to 320 nm and a maximum wavelength of light emission spectrum in the range of from 350 nm to 400 nm is especially preferable.

When the compound falls within the above-described range, there is no concern that the compound (A) contained in a cured product absorbs an external light and is colored to an extent of being visually confirmed, and curing properties of the adhered product in a light-shielding area are extremely excellent. Then, in view of the fact that the maximum wavelength of light emission spectrum falls within the above-described range, it becomes difficult to view light emission of the compound (A), and furthermore, an excellent curing action is revealed. The compound (A) is able to efficiently act on a photopolymerization initiator having an absorption wavelength of from 350 nm to 400 nm, and hence, it is suitable.

With respective to the above-described light absorption spectrum and light emission spectrum, for example, by preparing a solution of the compound (A) represented by the foregoing formula (1) in tetrahydrofuran (concentration: 0.002 wt %), a light absorption spectrum and a light emission spectrum of the obtained solution may be measured. The absorption spectrum can be measured by using a spectrophotometer (for example, "UV-3150", manufactured by Shimadzu Corporation, etc.), and the light emission spectrum can be measured by using a fluorophotometer (for example, "F-7000", manufactured by Hitachi High-Technologies Corporation, etc.).

Among the compounds represented by the foregoing formula (1), examples of the compound which when measured in tetrahydrofuran, has a maximum wavelength of light absorption spectrum in the range of from 270 to 320 nm and a maximum wavelength of light emission spectrum in the range of from 350 to 400 nm include 2-(4-biphenyl)-5-(4-tert-butylphenyl)-1,3,4-oxadiazole, 1,3-bis[2-(2,2'-bipyridin-6-yl)-1,3,4-oxadiazo-5-yl]benzene, 6,6'-bis[5-(biphenyl-4-yl)-1,3,4-oxadiazo-2-yl]-2,2'-bipyridyl, 1,3-bis[2-

(4-tert-butylphenyl)-1,3,4-oxadiazo-5-yl]benzene, and the like, and it is preferable to use a compound selected from these compounds as the compound (A).

2-(4-Biphenyl)-5-(4-tert-butylphenyl)-1,3,4-oxadiazole represented by the following formula (3) can be especially preferably used as the compound (A) represented by the foregoing formula (1).

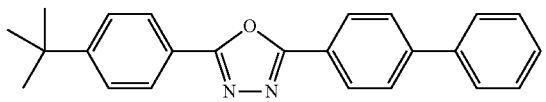
(3)

By allowing the ultraviolet-curable adhesive to contain such a compound (A) represented by the foregoing formula (1), it is possible to achieve thorough curing of the adhesive in a light-shielding area which is not irradiated by irradiation from one direction. Specifically, when the compound represented by the foregoing formula (1) absorbs an ultraviolet ray, light is radially emitted from the instant compound, and the emitted light reaches the above-described light-shielding area, and therefore, it is possible to achieve thorough curing of the adhesive even in the light-shielding area.

In addition, in the invention of the present application, it is preferable that the compound (A) represented by the foregoing formula (1) exists in a compatibilized state in the photocurable adhesive composition. This is because when the compound (A) exists in a compatibilized state, distribution of the compound (A) in the composition becomes uniform, and hence, it becomes possible to evenly cure the adhesive, whereby curing of the light-shielding area is more accelerated, too.

Since it becomes easy to uniformly mix the compound (A) in the adhesive composition, a racking point of the compound (A) represented by the foregoing formula (1) is preferably from 0° C. to 500° C., more preferably from 25° C. to 400° C., and especially preferably from 25° C. to 300° C.

Then, from the instant viewpoint, it is preferable that the photocurable adhesive composition obtained by containing the compound (A) represented by the foregoing formula (1) is in a compatibilized state (a state where the compound (A) represented by the foregoing formula (1) is dissolved in the composition) at from ordinary temperature (25° C.) to 80° C.

Examples of the compound (A) which is in a compatibilized state at from ordinary temperature (25° C.) to 80° C. in the ultraviolet-curable adhesive of the present invention include the compound represented by the foregoing formula (1) wherein X is a direct bond or the coupling group of the foregoing formula (2) wherein Z is a phenylene group.

In the ultraviolet-curable adhesive of the present invention containing such a compound (A) represented by the foregoing formula (1) and being preferably present in a compatibilized state, when formed into a cured product (for example, a cured product having a film thickness of 200 μm although it varies with an application), its transmittance to light at 400 nm is preferably 80% or more, and especially preferably 90% or more from the viewpoint of an enhancement of visibility.

Such a compound (A) represented by the foregoing formula (1) can be used solely or in admixture of two or more kinds thereof in an arbitrary proportion. A content proportion of the compound (A) represented by the foregoing formula (1) in the ultraviolet-curable adhesive of the present invention is usually from 0.001 to 5% by weight, and preferably from 0.001 to 1% by weight in terms of a total amount of the compound (A).

In addition, the ultraviolet-curable adhesive of the present invention contains (B) a photopolymerizable compound.

As the photopolymerizable compound (B), any compound can be used without being particularly limited so long as it is a compound which is polymerized with an ultraviolet ray. Examples thereof include (B-1) a (meth)acrylate compound, (B-2) an epoxy compound, (B-3) an oxetane compound, and the like.

In the ultraviolet-curable adhesive of the present invention, the (meth)acrylate compound (B-1) can be used as the photopolymerizable compound (B).

Examples of the (meth)acrylate compound (B-1) which can be used in the ultraviolet-curable adhesive of the present invention include (B-1-1) at least one (meth)acrylate oligomer of any of a urethane (meth)acrylate oligomer and a (meth)acrylate oligomer having at least one skeleton of a polyisoprene skeleton or a polybutadiene skeleton. For the ultraviolet-curable adhesive of the present invention, such (meth)acrylate oligomer (B-1-1) can be used solely or in combination of two or more kinds thereof.

By using such (meth)acrylate oligomer (B-1-1) as the photopolymerizable compound (B), it is possible to obtain an ultraviolet-curable adhesive which is excellent in flexibility and low in curing shrinkage ratio in terms of a cured product thereof. Therefore, it is preferable that the ultraviolet-curable adhesive of the present invention contains the (meth)acrylate oligomer (B-1-1).

Above all, (B-1-1a) a urethane (meth)acrylate oligomer can be suitably used as the photopolymerizable compound (B) because it is able to increase a curing performance of the resin in the light-shielding area while ensuring flexibility of the cured product.

As for the above-described (meth)acrylate oligomer (B-1-1), the urethane (meth)acrylate oligomer (B-1-1a) is described.

Although the urethane (met)acrylate oligomer (B-1-1a) which can be used for the ultraviolet-curable adhesive of the present invention is not particularly limited, a urethane (meth)acrylate oligomer which is obtained through a reaction among three members of a polyhydric alcohol, a polyisocyanate, and a hydroxyl group-containing (meth)acrylate and the like can be exemplified.

Examples of the above-described polyhydric alcohol include alkylene glycols having from 1 to 10 carbon atoms, such as neopentyl glycol, 3-methyl-1,5-pentanediol, ethylene glycol, propylene glycol, 1,4-butanediol, 1,6-hexanediol, etc.; triols such as trimethylolpropane, pentaerythritol, etc.; alcohols having a cyclic skeleton, such as tricyclodecanedimethylol, bis-[hydroxymethyl]-cyclohexane, etc.; polyester polyols obtained through a reaction between such a polyhydric alcohol and a polybasic acid (for example, succinic acid, phthalic acid, hexahydrophthalic anhydride, terephthalic acid, adipic acid, azelaic acid, tetrahydrophthalic anhydride, etc.); caprolactone alcohols obtained through a reaction between such a polyhydric alcohol and ε-caprolactone; polycarbonate polyols (for example, polycarbonate diol obtained through a reaction between 1,6-hexanediol and diphenyl carbonate, etc.); polyether polyols (for example, polyethylene glycol, polypropylene glycol, polytetramethylene glycol, ethylene oxide-modified bisphenol A, etc.); and the like.

From the viewpoint of adhesion to the base material, C2-C4-alkylene glycols having a molecular weight of 1,000 or more, and preferably from 1,000 to 5,000 are preferable.

Above all, polypropylene glycol having a molecular weight of 2,000 or more, for example, from about 2,000 to 5,000, is especially preferable.

Examples of the above-described organic polyisocyanate include isophorone diisocyanate, hexamethylene diisocyanate, tolylene diisocyanate, xylene diisocyanate, diphenylmethane-4,4'-diisocyanate, dicyclopentanyl isocyanate, and the like, with isophorone diisocyanate being preferable.

As the above-described hydroxyl group-containing (meth)acrylate, for example, hydroxy-C2-C4-alkyl (meth)acrylates such as hydroxyethyl (meth)acrylate, hydroxypropyl (meth)acrylate, hydroxybutyl (meth)acrylate, etc.; dimethylol cyclohexyl mono(meth)acrylate; hydroxycaprolactone (meth)acrylate; and the like can be used. Of these, 2-hydroxyethyl (meth)acrylate is preferable.

The above-described reaction is, for example, carried out in the following manner. That is, the above-described polyhydric alcohol is mixed with the above-described organic polyisocyanate such that a proportion of the isocyanate group of the above-described organic polyisocyanate is preferably from 1.1 to 2.0 equivalents, and more preferably from 1.1 to 1.5 equivalents to one equivalent of the hydroxyl group of the polyhydric alcohol, and the reaction is carried out at a reaction temperature of preferably from 70 to 90° C., thereby synthesizing a methane oligomer. Subsequently, the above-described hydroxyl group-containing (meth)acrylate is mixed such that a proportion of the hydroxyl group of the above-described hydroxyl group-containing (meth)acrylate is preferably from 1 to 1.5 equivalents to one equivalent of the isocyanate group of the obtained urethane oligomer, and the mixture is allowed to react at from 70 to 90° C., whereby the desired urethane (meth)acrylate oligomer (B-1-1a) can be obtained.

A weight average molecular weight of the urethane (meth)acrylate oligomer (B-1-1a) which can be used for the ultraviolet-curable adhesive of the present invention is preferably from about 7,000 to 25,000, and more preferably from about 10,000 to 20,000. When the weight average molecular weight is too low, at the time of curing the adhesive, shrinkage becomes large, whereas when the weight average molecular weight is too high, curing properties of the adhesive become poor.

In the ultraviolet-curable adhesive of the present invention, such urethane (meth)acrylate oligomer (B-1-1a) can be used solely or in combination of two or more kinds thereof in an arbitrary proportion. When the urethane (meth)acrylate oligomer is contained, its content proportion in the ultraviolet-curable adhesive of the present invention is usually from 5 to 90% by weight, preferably from 20 to 80% by weight, and more preferably from 25 to 50% by weight.

As for the (meth)acrylate oligomer (B-1-1), a (meth)acrylate oligomer (B-1-1b) having at least one skeleton of a polyisoprene skeleton or a polybutadiene skeleton is described.

As the (meth)acrylate oligomer (B-1-1b) having at least one skeleton of a polyisoprene skeleton or a polybutadiene skeleton (hereinafter also referred to as "the above-described oligomer (B-1-1b)"), which can be used for the ultraviolet-curable adhesive of the present invention, any (meth)acrylate oligomer can be used without being particularly limited so long as it is a known oligomer that is an oligomer having a polyisoprene skeleton and has a (meth)acryloyl group in an end thereof; a known oligomer that is an oligomer having a polybutadiene skeleton and has a (meth)acryloyl group in an end thereof; a known oligomer having both, a polyisoprene skeleton and a polybutadiene skeleton and having a (meth)acryloyl group in an end thereof; or the like.

As the above-described (meth)acrylate oligomer (B1-1-1b) having at least one skeleton of a polyisoprene skeleton or a polybutadiene skeleton, an oligomer obtained by the following production method (a), production method (b), or the like can be suitably used.

Production Method (a)

A method in which an isoprene polymer, a butadiene polymer, or a copolymer thereof is first synthesized, subsequently, an unsaturated acid anhydride is allowed to react with the obtained polymer, and thereafter, a hydroxy (meth)acrylate compound is allowed to react with a part or the whole of the obtained polymer.

Production Method (b)

A method in which an unsaturated carboxylic acid or its derivative is allowed to react with a hydroxyl group-terminated isoprene polymer, a hydroxyl group-terminated butadiene polymer, or an isoprene-butadiene copolymer having a hydroxyl group in an end thereof.

The oligomer obtained by the above-described production method (a) (a method in which an isoprene polymer, a butadiene polymer, or a copolymer thereof is first synthesized, subsequently, an unsaturated acid anhydride is allowed to react with these polymers, and thereafter, a hydroxy (meth)acrylate compound is allowed to react with a part or the whole of the obtained polymer) is described.

As the polymer which is first synthesized in the above-described production method (a), an isoprene polymer or a butadiene polymer obtained by polymerizing one kind of isoprene or butadiene solely may be used, or an isoprene-butadiene copolymer obtained by copolymerizing a mixture of isoprene and butadiene may be used.

Examples of a method for polymerizing isoprene, butadiene, or a mixture of the both include a method in which isoprene and/or butadiene is subjected to anionic polymerization by using, as an initiator, an alkyllithium such as methyllithium, ethyllithium, s-butyllithium, n-butyllithium, pentyllithium, etc., a sodium naphthalene complex, or the like. In addition, such a polymer can also be produced by a method in which isoprene and/or butadiene is subjected to radical polymerization by using, as an initiator, a peroxide such as benzoyl peroxide, etc., or an azobisnitrile compound such as azobisisobutyronitrile, etc.

It is to be noted that such a polymerization reaction can be carried out through a reaction at from −100° C. to 200° C. for from 0.5 to 100 hours in the presence of a solvent such as hexane, heptane, toluene, xylene, etc.

From the viewpoint of imparting flexibility, a number average molecular weight of the above-described polymer which is used in the present invention is usually in the range of from 2,000 to 100,000, preferably in the range of from 5,000 to 50,000, and especially preferably in the range of from 20,000 to 50,000.

Subsequently, an unsaturated acid anhydride is allowed to react with the polymer obtained by the above-described method. This reaction can be, for example, carried out through a reaction between the above-described polymer and unsaturated acid anhydride usually at a reaction temperature of from ordinary temperature to 300° C. for from 0.5 to 100 hours in the presence of a solvent which is inert to the reaction, such as hexane, heptane, toluene, xylene, etc., or in the absence of a solvent.

As the unsaturated acid anhydride in the above-described reaction, for example, maleic anhydride, phthalic anhydride, hexahydrophthalic anhydride, methylhexahydrophthalic anhydride, etc., can be used.

In general, a use amount of the above-described unsaturated acid anhydride is preferably in the range of from 0.1 to 200 parts by weight, and more preferably in the range of from 0.1 to 100 parts by weight based on 100 parts by weight of the above-described polymer.

When reacted under the above-described conditions, an addition number of the acid anhydride group to the above-described polymer is usually in the range of from 1 to 30, and preferably in the range of from 2 to 20 per molecule.

Subsequently, by allowing a hydroxy (meth)acrylate compound to react with a part or the whole of the acid anhydride group introduced into the above-described polymer, it is possible to obtain a (meth)acrylate oligomer having at least one skeleton of a polysioprene skeleton or a polybutadiene skeleton.

In general, the above-described reaction can be carried out by mixing a hydroxy (meth)acrylate compound such that a proportion of the hydroxyl group of the hydroxy (meth) acrylate compound is preferably from 1 to 1.5 equivalents to one equivalent of the acid anhydride group in the above-described polymer and allowing the mixture to react at a reaction temperature of from 20 to 200° C. for from 0.1 to 100 hours in the presence of a solvent such as hexane, heptane, etc. or under a solvent-free condition.

As the hydroxy (meth)acrylate compound which is used for the above-described reaction, for example, hydroxy-C2-C4-alkyl (meth)acrylates such as hydroxyethyl (meth)acrylate, hydroxypropyl (meth)acrylate, hydroxybutyl (meth) acrylate, etc.; dimethylol cyclohexyl mono(meth)acrylate; hydroxycaprolactone (meth)acrylate; and the like can be used.

Next, the oligomer obtained by the above-described production method (b) (a method of allowing an unsaturated carboxylic acid or its derivative to react with an isoprene polymer having a hydroxyl group in an end thereof, a butadiene polymer having a hydroxyl group in an end thereof, or an isoprene-butadiene copolymer having a hydroxyl group in an end thereof) is described.

By allowing an unsaturated carboxylic acid or its derivative to react with a part or the whole of a hydroxyl group-terminated isoprene polymer, a hydroxyl group-terminated butadiene polymer, or an isoprene-butadiene copolymer having a hydroxyl group in an end thereof, it is possible to obtain a (meth)acrylate oligomer having at least one skeleton of a polyisoprene skeleton or a polybutadiene skeleton.

In general the above-described reaction can be carried out by allowing the above-described polymer and an unsaturated carboxylic acid or its derivative to react with each other at a reaction temperature of from 20 to 200° C. for from 0.1 to 100 hours in the presence of a solvent such as hexane, heptane, etc. or under a solvent-free condition.

As the unsaturated carboxylic acid or its derivative which is used for the above-described reaction, for example, unsaturated carboxylic acids such as acrylic acid, methacrylic acid, maleic acid, α-ethylacrylic acid, fumaric acid, itaconic acid, citraconic acid, tetrahydrophthalic acid, methyltetrahydrophthalic acid, etc.; and derivatives thereof such as their acid halides, amides, imides, anhydrides, or esters, etc. can be used.

As specific examples of the oligomer (B-1-1b), UC-203, manufactured by Kuraray Co., Ltd, (a product name; an esterification product oligomer between a maleic anhydride adduct of an isoprene polymer and 2-hydroxyethyl methacrylate), NISSO-PB TE-2000, manufactured by Nippon Soda Co., Ltd. (a both ends methacrylate-modified butadiene-based oligomer), and the like can be exemplified.

In the ultraviolet-curable adhesive of the present invention, the oligomer (B-1-1b) can be used solely or in combination of two or more kinds thereof in an arbitrary proportion. When the oligomer (B-1-1b) is contained, its content proportion in the ultraviolet-curable adhesive of the present invention is usually from 5 to 90% by weight, preferably from 20 to 80% by weight, and more preferably from 25 to 50% by weight.

In view of the fact that a cured product having excellent flexibility and low curing shrinkage ratio can be obtained, it is preferable that the ultraviolet-curable adhesive of the present invention contains, as the photopolymerizable compound (B), such (meth)acrylate oligomer (B-1-1), namely at least one of the above-described urethane (meth)acrylate oligomer (B-1-1a) and the above-described oligomer (B-1-1b).

At that time, a content proportion of the (meth)acrylate oligomer (B-1-1) in the ultraviolet-curable adhesive of the present invention is usually from 5 to 90% by weight, and preferably from 20 to 50% by weight.

In the ultraviolet-curable adhesive of the present invention, (B-1-2) a monofunctional (meth)acrylate monomer can be used as the (meth)acrylate compound (B-1).

Although the monofunctional (meth)acrylate monomer (B-1-2) which is contained in the ultraviolet-curable adhesive of the present invention is not particularly limited, for example, alkyl (meth)acrylates having from 5 to 20 carbon atoms, such as isooctyl (meth)acrylate, isoamyl (meth)acrylate, lauryl (meth)acrylate, isodecyl (meth)acrylate, stearyl (meth)acrylate, cetyl (meth)acrylate, isomyristyl (meth) acrylate, tridecyl (meth)acrylate, etc.; (meth)acrylates having a cyclic skeleton, such as benzyl (meth)acrylate, tetrahydrofurfuryl (meth)acrylate, acryloyl morpholine, phenylglycidyl (meth)acrylate, tricyclodecane (meth)acrylate, dicyclopentenyl acrylate, dicyclopentenyloxyethyl (meth)acrylate, isobornyl (meth)acrylate, dicyclopentanyl (meth)acrylate, 1-adamantyl acrylate, 2-methyl-2-adamantyl acrylate, 2-ethyl-2-adamantyl acrylate, 1-adamantyl methacrylate, polypropylene oxide-modified nonylphenyl (meth)acrylate, dicyclopentadieneoxyethyl (meth)acrylate, etc.; hydroxyl group-containing alkyl (meth)acrylates having from 1 to 5 carbon atoms, such as 2-hydroxypropyl (meth)acrylate, 4-hydroxybutyl (meth)acrylate, etc.; polyalkylene glycol (meth)acrylates such as ethoxydiethylene glycol (meth)acrylate, polypropylene glycol (meth)acrylate, polypropylene oxide-modified nonylphenyl (meth)acrylate, etc.; phosphoric acid (meth)acrylates such as ethylene oxide-modified phenoxylated phosphoric acid (meth)acrylate, ethylene oxide-modified butoxylated phosphoric acid (meth)acrylate, ethylene oxide-modified octyloxylated phosphoric acid (meth)acrylate, etc.; and the like can be exemplified.

Above all, alkyl (meth)acrylates having from 10 to 20 carbon atoms, 2-ethylhexyl carbitol acrylate, acryloyl morpholine, hydroxyl group-containing alkyl (meth)acrylates having from 1 to 5 carbon atoms, such as 4-hydroxybutyl (meth)acrylate, etc., tetrahydrofurfuryl (meth)acrylate, isostearyl (meth)acrylate, dicyclopentenyloxyethyl (meth) acrylate, dicyclopentanyl (meth)acrylate, and polypropylene oxide-modified nonylphenyl (meth)acrylate are exemplified as the preferred monofunctional (meth)acrylate monomer (B-1-2).

In particular, from the viewpoint of flexibility of a cured product, a compound selected from the group consisting of an alkyl (meth)acrylate having from 10 to 20 carbon atoms, dicyclopentenyloxyethyl (meth)acrylate, polypropylene oxide-modified nonylphenyl (meth)acrylate, and tetrahydrofurfuryl (meth)acrylate is preferable as the monofunctional (meth)acrylate monomer (B-1-2).

Meanwhile, from the viewpoint of enhancing adhesion to glass, it is preferable to use a hydroxyl group-containing alkyl (meth)acrylate having from 1 to 5 carbon atoms, acryloyl morpholine, or dicyclopentanyl (meth)acrylate as the monofunctional (meth)acrylate monomer (B-1-2).

It is the most preferable to use dicyclopentenyloxyethyl (meth)acrylate or dicyclopentanyl (meth)acrylate as the monofunctional (meth)acrylate monomer (B-1-2) which is contained in the ultraviolet-curable adhesive of the present invention.

In the ultraviolet-curable adhesive of the present invention, such monofunctional (meth)acrylate monomer (B-1-2) can be used solely or in combination of two or more kinds thereof in an arbitrary proportion.

It is preferable that the ultraviolet-curable adhesive of the present invention contains the above-described monofunctional (meth)acrylate monomer (B-1-2) as the photopolymerizable compound (B). A content proportion of the above-described monofunctional (meth)acrylate monomer (B-1-2) in the ultraviolet-curable adhesive of the present invention is usually from 5 to 70% by weight, and preferably from 5 to 50% by weight.

The ultraviolet-curable adhesive of the present invention can contain (B-1-3) a (meth)acrylate monomer other than the monofunctional (meth)acrylate monomer (B-1-2) (hereinafter also referred to as "(meth)acrylate monomer (B-1-3)") within the range where properties of the present invention are not impaired.

Examples of a bifunctional (meth)acrylate monomer (B-1-3) include tricyclodecanedimethylol di(meth)acrylate, dioxane glycol di(meth)acrylate, polypropylene glycol di(meth)acrylate, polytetramethylene glycol di(meth)acrylate, an alkylene oxide-modified bisphenol A type di(meth)acrylate, caprolactone-modified hydroxypivalic acid neopentyl glycol di(meth)acrylate, ethylene oxide-modified phosphoric acid di(meth)acrylate, and the like.

Examples of a trifunctional (meth)acrylate monomer (B-1-3) include trimethylol C2-C10-alkane tri(meth)acrylates such as trimethylolpropane tri(meth)acrylate, trimethyloloctane tri(meth)acrylate, etc.; trimethylol C2-C10-alkane polyalkoxy tri(meth)acrylates such as trimethylolpropane polyethoxy tri(meth)acrylate, trimethylolpropane polypropoxy tri(meth)acrylate, trimethylolpropane polyethoxypolypropoxy tri(meth)acrylate, etc.; alkylene oxide-modified trimethylolpropane tri(meth)acrylates such as tris[(meth)acryloyloxyethyl]isocyanurate, pentaerythritol tri(meth)acrylate, ethylene oxide-modified trimethylolpropane tri(meth)acrylate, propylene oxide-modified trimethylolpropane tri(meth)acrylate, etc.; and the like.

Examples of a tetrafunctional or multifunctional (meth)acrylate monomer (B-1-3) include pentaerythritol polyethoxy tetra(meth)acrylate, pentaerythritol polypropoxy tetra(meth)acrylate, pentaerythritol tetra(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, and the like.

In the present invention, in the case of using the polyfunctional (meth)acrylate monomer (B-1-3) in combination, from the viewpoint of suppressing curing shrinkage at the time of curing of the ultraviolet-curable adhesive, it is preferable to use a bifunctional (meth)acrylate.

In the ultraviolet-curable adhesive of the present invention, such a (meth)acrylate monomer (B-1-3) other than the monofunctional (meth)acrylate monomer can be used solely or in admixture of two or more kinds thereof in an arbitrary proportion. In the case of containing the (meth)acrylate monomer (B-1-3), its content proportion in the ultraviolet-curable adhesive of the present invention is usually from 5 to 70% by weight, and preferably from 5 to 50% by weight. When the content proportion of the (meth)acrylate monomer (B-1-3) falls within the above-described preferred range, not only curing properties are improved, but shrinkage at the time of curing does not become large, and hence, such is preferable.

In the ultraviolet-curable adhesive of the present invention, (B-1-4) an epoxy (meth)acrylate can be used within the range where properties of the present invention are not impaired. The epoxy (meth)acrylate (B-1-4) has functions of not only enhancing curing properties of the obtained ultraviolet-curable adhesive but enhancing curing rate and hardness of a cured product.

As the epoxy (meth)acrylate (B-1-4) which can be used for the ultraviolet-curable adhesive of the present invention, any compound which is obtained through a reaction between a glycidyl ether type epoxy compound and (meth)acrylic acid can be used. As the glycidyl ether type epoxy compound for the purpose of obtaining a preferred epoxy (meth)acrylate, a diglycidyl ether of bisphenol A or an alkylene oxide adduct thereof, a diglycidyl ether of bisphenol F or an alkylene oxide adduct thereof, a diglycidyl ether of hydrogenated bisphenol A or an alkylene oxide adduct thereof, a diglycidyl ether of hydrogenated bisphenol F or an alkylene oxide adduct thereof, ethylene glycol diglycidyl ether, propylene glycol diglycidyl ether, neopentyl glycol diglycidyl ether, butanediol diglycidyl ether, hexanediol diglycidyl ether, cyclohexanedimethanol diglycidyl ether, polypropylene glycol diglycidyl ether, and the like can be exemplified.

The above-described epoxy (meth)acrylate (B-1-4) is obtained by allowing such a glycidyl ether type epoxy compound and (meth)acrylic acid to react with each other under the following conditions.

(Meth)acrylic acid is allowed to react in a ratio of preferably from 0.9 to 1.5 moles, and more preferably from 0.95 to 1.1 moles relative to one equivalent of the epoxy group of the glycidyl ether type epoxy compound. A reaction temperature is preferably from 80 to 120° C., and a reaction time is from about 10 to 35 hours. In order to accelerate this reaction, for example, it is preferable to use a catalyst such as triphenyl phosphine, 2,4,6-tris(dimethylaminomethyl) phenol (TAP), triethanolamine, tetraethylammonium chloride, etc. In addition, in order to prevent polymerization during the reaction from occurring, for example, p-methoxyphenol, methylhydroquinone, etc. can be used as a polymerization inhibitor, too.

Examples of the epoxy (meth)acrylate (B-1-4) which can be suitably used in the present invention include bisphenol A type epoxy (meth)acrylate which is obtained from the above-described bisphenol A type epoxy compound.

A weight average molecular weight of the epoxy (meth)acrylate (B-1-4) which can be used in the present invention is preferably from 500 to 10,000.

In the ultraviolet-curable adhesive of the present invention, such epoxy (meth)acrylatee (B-1-4) can be used solely or in combination of two or more kinds thereof in an arbitrary proportion. In the case of containing the epoxy (meth)acrylate (B-1-4), its content proportion in the ultraviolet-curable adhesive of the present invention is usually from 5 to 90% by weight, preferably from 20 to 80% by weight, and more preferably from 25 to 50% by weight.

Meanwhile, from the viewpoint of imparting flexibility, a content proportion of the above-described epoxy (meth)acrylate (B-1-4) in the ultraviolet-curable adhesive of the present invention is preferably not more than 20% by weight, and especially preferably not more than 10% by weight.

In the ultraviolet-curable adhesive of the present invention, (B-2) an epoxy compound can be used as the photopolymerizable compound (B).

Specific examples of the epoxy compound (B-2) include polycondensates between a bisphenol (for example, bisphenol A, bisphenol F, bisphenol S, biphenol, bisphenol AD, etc.) or a phenol (for example, phenol, an alkyl-substituted phenol, an aromatic substituted phenol, naphthol, an alkyl-substituted naphthol, dihydroxybenzene, an alkyl-substituted dihydroxybenzene, dihydroxynaphthalene, etc.) and an aldehyde of every kind (for example, formaldehyde, acetaldehyde, an alkyl aldehyde, benzaldehyde, an alkyl-substituted benzaldehyde, hydroxybenzaldehyde, naphthaldehyde, glutaraldehyde, phthalaldehyde, crotonaldehyde, cinnamaldehyde, etc.); polycondensates between the above-described phenol and a diene compound of every kind (for example, dicyclopentadiene, a terpene, vinylcyclohexene, norbornadiene, vinylnorbornene, tetrahydroindene, divinylbenzene, divinylbiphenyl diisopropenylbiphenyl, butadiene, isoprene, etc.); polycondensates between the above-described phenol and a ketone (for example, acetone, methyl ethyl ketone, methyl isobutyl ketone, acetophenone, benzophenone, etc.); polycondensates between the above-described phenol and an aromatic dimethanol (for example, benzenedimethanol, biphenyldimethanol, etc.); polycondensates between the above-described phenol and an aromatic dichloromethyl (for example, α,α'-dichloroxylene, bischloromethylbiphenyl, etc.); polycondensates between the above-described phenol and an aromatic bisalkoxymethyl (for example, bismethoxymethylbenzene, bismethoxymethylbiphenyl, bisphenoxymethylbiphenyl, etc.); polycondensates between the above-described bisphenol and an aldehyde of every kind; glycidyl ether-based epoxy resins, alicyclic epoxy resins, glycidyl amine-based epoxy resins, and glycidyl ester-based epoxy resins, which are obtained by glycidylating an alcohol or the like; and the like. The epoxy compound (B-2) is not limited to these materials so long as it is a usually used epoxy resin. These materials may be used solely or in combination of two or more kinds thereof.

In the ultraviolet-curable adhesive of the present invention, such epoxy compound (B-2) can be used solely or in combination of two or more kinds thereof in an arbitrary proportion. In the case of containing the epoxy compound (B-2), its content proportion to the ultraviolet-curable adhesive of the present invention is usually from 5 to 70% by weight, and preferably from 5 to 50% by weight.

In the ultraviolet-curable adhesive of the present invention, (B-3) an oxetane compound can be used as the photopolymerizable compound (B).

Specific examples of the oxetane compound (B-3) include 4-bis[(3-ethyl-3-oxetanylmethoxy)methyl]benzene, 4-bis[(3-methyl-3-oxetanylmethoxy)methyl]benzene, 3-methyl-3-glycidyloxetane, 3-ethyl-3-hydroxymethyloxetane, 3-methyl-3-hydroxymethyloxetane, di(1-ethyl(3-oxetanyl))methyl ether, 3-ethyl-3-(phenoxymethyl)oxetane, 3-(cyclohexyloxy)methyl-3-ethyloxetane, xylylene bisoxetane, phenol novolac oxetane, and the like. The oxetane compound (B-3) is not limited to these materials so long as it is a usually used oxetane compound.

In the ultraviolet-curable adhesive of the present invention, such oxetane compound (B-3) can be used solely or in combination of two or more kinds thereof in an arbitrary proportion. In the case of containing the oxetane compound (B-3), its content proportion in the ultraviolet-curable adhesive of the present invention is usually from 5 to 70% by weight, and preferably from 5 to 50% by weight.

In the ultraviolet-curable adhesive of the present invention, it is preferable to use a combination of the above-described (meth)acrylate oligomer (B-1-1) and the above-described monofunctional (meth)acrylatee monomer (B-1-2) as the photopolymerizable compound (B).

At that time, a urethane (meth)acrylate oligomer which is obtained through a reaction among three members of a polyhydric alcohol, a polyisocyanate, and a hydroxyl group-containing (meth)acrylate, or a (meth)acrylate oligomer having at least one skeleton of a polyisoprene skeleton or a polybutadiene skeleton which is obtained by allowing a hydroxy (meth)acrylate compound to react with a part or the whole of an isoprene polymer, a butadiene polymer, or an unsaturated acid anhydride adduct of a copolymer of these polymers is preferable as the (meth)acrylate oligomer (B-1-1).

In addition, at that time, the monofunctional (meth)acrylate monomer (B-1 -2) is preferably a compound selected from the group consisting of an alkyl (meth)acrylate having from 10 to 20 carbon atoms, 2-ethylhexyl carbitol acrylate, acryloyl morpholine, a hydroxyl group-containing alkyl (meth)acrylate having from 1 to 5 carbon atoms, tetrahydrofurfuryl (meth)acrylate, isostearyl (meth)acrylate, dicyclopentenyloxyethyl (meth)acrylate, dicyclopentanyl (meth)acrylate, and polypropylene oxide-modified nonylphenyl (meth)acrylate.

The ultraviolet-curable adhesive of the present invention not only containing, as the (meth)acrylate oligomer (B-1-1), a urethane (meth)acrylate oligomer which is obtained through a reaction among three members of polypropylene glycol, isophorone diisocyanate, and 2-hydroxyethyl (meth)acrylate, or an esterification product oligomer between, a maleic anhydride adduct of an isoprene polymer and 2-hydroxyethyl methacrylate but containing, as the monofunctional (meth)acrylate monomer (B-1-2), dicyclopentenyloxyethyl (meth)acrylate or dicyclopentanyl (meth)acrylate is especially preferable.

A content proportion of the photopolymerizable compound (B) in the ultraviolet-curable adhesive of the present invention is usually from 5 to 95% by weight, preferably from 20 to 90% by weight, and more preferably from 40 to 80% by weight. Above all, the ultraviolet-curable adhesive of the present invention containing, as the photopolymerizable compound (B), the urethane (meth)acrylate oligomer (B-1-1a) in a proportion of from 5 to 90% by weight, preferably from 20 to 80% by weight, and more preferably from 25 to 50% by weight, or containing not only the above-described oligomer (B-1-1b) in a proportion of from 5 to 90% by weight, preferably from 15 to 80% by weight, and more preferably from 20 to 50% by weight but the monofunctional (meth)acrylate monomer (B-1-2) in a proportion of from 5 to 70% by weight and preferably from 5 to 50% by weight is more preferable.

The ultraviolet-curable adhesive of the present invention contains (C) a photopolymerization initiator.

The photopolymerization initiator (C) which is contained in the ultraviolet-curable adhesive of the present invention is not particularly limited, and known radical polymerization initiators and cationic polymerization initiators, and the like can be used.

As for specific examples of the radical polymerization, initiator and product names thereof, for example, 1-hydroxycyclohexyl phenyl ketone (IRGACURE (a registered trademark, hereinafter the same) 184; manufactured by BASF), a 2-hydroxy-2-methyl-[4-(1-methylvinyl)phenyl]propanol oligomer (ESACURE ONE; manufactured by Lamberti), 1-[4-(2-hydroxyethoxy)-phenyl]-2-hydroxy-2-methyl-1-propan-1-one (IRGACURE 2959; manufactured by BASF), 2-hydroxy-1-{4-[4-(2-hydroxy-2-methylpropionyl)benzyl]phenyl}-2-methylpropan-1-one (IRGACURE 127; manufactured by BASF), 2,2-dimethoxy-2-phenylacetophenone (IRGACURE 651; manufactured by BASF), 2-hydroxy-2-methyl-1-phenylpropan-1-one (DAROCUR (a registered trademark) 1173; manufactured by BASF), 2-methyl-1-[4-methylthio)pehnyl]-2-morpholinopropan-1-one (IRGACURE 907; manufactured by BASF), a mixture of oxyphenylacetic acid 2-[2-oxo-2-phenylacetoxyethoxy]ethyl ester and oxyphenylacetic acid 2-[2-hydroxyethoxy]ethyl ester (IRGACURE 754; manufactured by BASF), bis($\eta^5$-2,4-cyclopentadien-1-yl)-bis(2,6-difluoro-3-(1H-pyrrol-1-yl)-phenyl)titanium (IRGACURE 784; manufactured by BASF), 2-benzyl-2-dimethylamino-1-(4-morpholinophenyl)butan-1-one, 2-chlorothioxanthone, 2,4-dimethylthioxoanthone, 2,4-diisopropylthioxanthone, isopropylthioxanthone, 2,4,6-trimethylbenzoyldiphenylphosphine oxide, bis(2,4,6-trimethylbenzoyl)phenylphosphine oxide, bis(2,6-dimethoxybenzoyl)-2,4,4-trimethylpentylphosphine oxide, and the like can be exemplified.

As for specific examples of the cationic polymerization initiator, for example, bis(4-tert-butylphenyl)iodonium hexafluorophosphate, bis(4-tert-butylphenyl)iodonium triflate, 2-(3,4-dimethoxystyryl)-4,6-bis(trichlormethyl)-1,3,5-triazine, diphenyliodonium hexafluoroarsenate, diphenyliodonium trifluoromethanesulfonic acid, 2-[2-(furan-2-yl)vinyl]-4,6-bis(trichloromethyl)-1,3,5-triazine, triphenylsulfonium tetrafluoroborate, tri-p-tolylsulfonium hexafluorophosphate, tri-p-tolylsulfonium trifluoromethanesulfonate, 4-isopropyl-4'-methyldiphenyliodonium tetrakis(pentafluorophenyl)borate, and the like can be exemplified.

It is preferable that the photopoiymerixation initiator (C) which is contained in the ultraviolet-curable adhesive of the present invention has absorption at a wavelength of the light emitted by the compound (A) represented by the foregoing formula (1). The terms "has absorption at a wavelength of the light emitted by the compound (A)" as referred to herein mean that the photopolymerization initiator (C) may absorb the light emitted by the compound (A) to be used, whereby activation of the photopolymerization initiator (C) is assisted. In view of the facts that the compound which absorbs an ultraviolet ray to emit light emits light containing an ultraviolet ray, and that the photopolymerization initiator (C) which is used for the ultraviolet-curable resin composition absorbs an ultraviolet ray, in the present invention, any compound capable of absorbing an ultraviolet ray to emit light can be used. As for the degree of absorption, for example, an absorption coefficient per unit weight of the photopolymerization initiator (C) at a maximum wavelength of the emitted light is 50 mL/(g·cm) or more, preferably 300 mL/(g·cm) or more, and more preferably 400 mL/(g·cm) or more.

Preferred specific examples of the photopolymerization initiator (C) which is used for the ultraviolet-curable adhesive of the present invention include the following compounds.

From the viewpoints of transparency and curing properties, 1-hydroxycyclohexyl phenyl ketone (IRGACURE 184; manufactured by BASF) and a 2-hydroxy-2-methyl-[4-(1-methylvinyl)phenyl]propanol oligomer (ESACURE KIP-150; manufactured by Lamberti) are exemplified as the preferred photopolymerization initiator (C). From the viewpoint of making curing properties of the inside of the adhesive good, 2,4,6-trimethylbenzoyldiphenylphosphine oxide (SPEEDCURE TPO; manufactured by LAMBSON) and bis(2,4,6-trimethylbenzoyl)phenylphosphine oxide (IRGACURE 819; manufactured by BASF) are exemplified as the preferred photopolymerization initiator (C). From the viewpoint of suppressing discoloration of the adhesive, 2,4,6-trimethylbenzoyldiphenylphosphine oxide (SPEEDCURE TPO; manufactured by LAMBSON) is exemplified as the preferred photopolymerization initiator (C).

Furthermore, in view of the facts that handling under a specified circumference such as a yellow lamp circumference, etc. is not required; and internal curing properties are excellent 2,4,6-trimethylbenzoyldiphenylphosphine oxide (SPEEDCURE TPO) is exemplified as the especially preferred photopolymerization initiator (C).

In addition, such photopolymerization initiator (C) can be used solely or in combination of two or more kinds thereof in an arbitrary proportion.

As for the photopolymerization initiator (C), its absorption coefficient per unit weight at 365 nm as measured in acetonitrile is preferably from 85 to 10,000 mL/(g·cm), more preferably from 150 to 10,000 mL/(g·cm), and especially preferably from 400 to 10,000 mL/(g·cm). The measurement of the absorption coefficient can be carried out by a usual method by using a spectral photometer or the like. In addition, as for the solvent for measurement, under certain circumstances, the measurement may also be carried out in methanol, and even in that case, the foregoing range of the absorption coefficient does not change.

In addition, as for the photopolymerization initiator (C), its absorption coefficient per unit weight at 405 nm as measured in acetonitrile is preferably from 5 to 3,000 mL/(g·cm), more preferably from 100 to 3,000 mL/(g·cm), and especially preferably from 200 to 3,000 mL/(g·cm).

A photopolymerization initiator which is satisfied with both the conditions of absorption coefficient is extremely preferable as the photopolymerization initiator (C) of the present invention.

In addition, a photopolymerization initiator having a molar absorption coefficient at 400 nm as measured in acetonitrile of from 200 $M^{-1}$·cm to 100,000 $M^{-1}$·$cm^{-1}$ is also preferable.

By using the photopolymerization initiator (C) not only having an absorption coefficient falling within the foregoing range but having absorption at a wavelength of the light emitted by the compound (A) represented by the foregoing formula (1), curing of the ultraviolet-curable resin composition existing in the light-shielding area is more accelerated. This is because in view of the fact that an ultraviolet ray of a long wavelength as from 350 nm to 410 nm is large in properties of causing diffraction, so that it is able to go around to the rear side of the light-shielding portion, even in the case where the light-shielding portion that disturbs irradiation with an ultraviolet ray exists, the ultraviolet ray of a long wavelength is able to reach the light-shielding area.

For that reason, not only in view of the fact that the photopolymerization initiator (C) has an absorption coefficient of the foregoing range, it is able to absorb an ultraviolet ray of a long wavelength, but even when the photopolymerization initiator (C) having absorption at a wavelength of the light emitted by the compound (A) represented by the foregoing formula (1) exists in the light-shielding area, it is able to absorb the light emitted by the compound (A) represented by the foregoing formula (1) and also absorb light of a long wavelength diffracted upon irradiation from a light source. A decomposition reaction of the photopolymerization initiator (C) is accelerated due to such a synergistic effect, and therefore, even in the case where the light-shielding area spreads over a wide range, it becomes possible to thoroughly cure the ultraviolet-curable adhesive existing in the light-shielding area.

Furthermore, by using a combination of the compound (A) whose maximum wavelength of light absorption spectrum as measured in tetrahydrofuran falls within the above-described suitable range with the photopolymerization initiator (C) whose absorption, coefficient falls within the above-described suitable range, curing of the ultraviolet-curable adhesive existing in the light-shielding area is more accelerated, and therefore, the combination of the compound (A) whose maximum wavelength of light absorption spectrum falls within the above-described suitable range with the photopolymerization initiator (C) is especially preferable.

Examples of the photopolymerization initiator whose absorption coefficient per unit weight at 365 nm is in an especially preferred range of from 400 to 10,000 mL/(g·cm) include bis(2,4,6-trimethylbenzoyl)phenylphosphine oxide (IRGACURE 819; manufactured by BASF), 2,4,6-trimethylbenzoyldiphenylphosphine oxide (SPEEDCURE TPO; manufactured by LAMBSON), bis($\eta^5$-2,4-cyclopentadien-1-yl)-bis(2,6-difluoro-3-(1H-pyrrol-1-yl)-phenyl)titanium (IRGACURE 784; manufactured by BASF), and the like.

As the photopolymerization initiator (C) of the present invention, 2,4,6-trimethylbenzoyldiphenylphosphine oxide (SPEEDCURE TPO) is especially preferable.

In the ultraviolet-curable adhesive of the present invention, such photopolymerization initiator (C) can be used solely or in combination of two or more kinds thereof in an arbitrary proportion. A content proportion of the photopolymerization initiator (C) in the ultraviolet-curable adhesive of the present invention is usually from 0.01 to 5% by weight, and preferably from 0.2 to 3% by weight. In the case of using two or more kinds of the photopolymerization initiator (C), a content proportion of a total amount thereof may fall within the foregoing range.

In the ultraviolet-curable adhesive of the present invention, a photopolymerization initiation assistant as described below, (D) a softening component as described later, additives as described later, and the like can be contained as other components than the above-described compound (A), the photopolymerizable compound (B), and photopolymerization initiator (C). A total amount of these other components in the total amount of the ultraviolet-curable adhesive is from about 0 to 80% by weight, and preferably from about 5 to 70% by weight.

In the ultraviolet-curable adhesive of the present invention, an amine that may work as the photopolymerization initiation assistant, or the like can also be used as one of the above-described other components in combination with the above-described photopolymerization initiator (C). Examples of the amine or the like which can be used include 2-dimethylaminoethyl benzoate, dimethylaminoacetophenone, ethyl p-dimethylaminobenzoate, isoamyl p-dimethylaminobenzoate, and the like. In the case of using the photopolymerization initiation assistant such as an amine, etc., its content amount in the ultraviolet-curable adhesive of the present invention is usually from 0.005 to 5% by weight, and preferably from 0.01 to 3% by weight.

In the ultraviolet-curable adhesive of the present invention, (D) a softening component can be contained, if desired. In the present invention, known softening components and plasticizers which are usually used in an ultraviolet-curable adhesive can be used as the softening component (D).

Specific examples of the softening component (D) include oligomers and polymers which are not included in the above-described component (B); and compounds which are used as a plasticizer or the like, such as phthalic acid esters, phosphoric acid esters, glycol esters, glycol ethers, aliphatic dibasic acid esters, fatty acid esters, citric acid esters, epoxy-based plasticizers, castor oils, terpene-based hydrogenated resins, etc.

As examples of the oligomers and polymers which are used as the softening component (D), polyisoprene-based, polybutadiene-based, or xylene-based oligomers and polymers, hydroxyl group-containing polyisoprene-based or hydroxyl group-containing polybutadiene-based oligomers and polymers, and polyether compounds can be exemplified.

That is, polyisoprene skeleton- or/and polybutadiene skeleton-containing oligomers and polymers, or xylene skeleton-containing oligomers and polymers, which may contain a hydroxyl group in an end thereof or the like; polyether compounds; and the like can be exemplified.

Of these, polyisoprene skeleton- or/and polybutadiene skeleton-containing polymers which contain a hydroxyl group in an end thereof or the like; and polyether compounds can be exemplified as preferred materials.

As for specific examples of the polyether compound, di(allyl or/and C1-C4-alkyl) ethers of poly-C2-C4-alkylene glycols of polyether compounds, such as polypropylene glycol diallyl ether, polypropylene glycol dimethyl ether, polypropylene glycol dibutyl ether, polypropylene glycol allyl butyl ether, polyethylene glycol-polypropylene glycol diallyl ether, polyethylene glycol-polypropylene glycol dibutyl ether, polyethylene glycol-polypropylene glycol allyl butyl ether, etc., can be exemplified.

A weight average molecular weight of such a polymer is preferably from about 500 to 30,000, more preferably from about 500 to 25,000, still more preferably from about 500 to 20,000, and especially preferably from about 500 to 15,000.

In the case of using such a softening component (D), its content proportion in the ultraviolet-curable adhesive of the present invention is usually from 10 to 80% by weight, and preferably from 10 to 70% by weight.

In addition, in the ultraviolet-curable adhesive of the present invention, a (meth)acrylic polymer can be used as the softening component (D).

Examples of the (meth)acrylic polymer which can be used in the present invention include polymers obtained by polymerizing an acrylic or methacrylic monomer as a raw material; and copolymers between the instant monomer and a polymerizable monomer other than the instant monomer. These (meth)acrylic polymers can be produced by a usual method such as solution polymerization, suspension polymerization, bulk polymerization, etc.

Examples of the production method which is especially preferable include a method for undergoing the production by continuously carrying out radical polymerization at a high temperature. Specifically, the (meth)acrylic polymer is produced by the following process. First of all, an acrylic or methacrylic monomer is mixed with a minute amount of a polymerization initiator and a minute amount of a solvent. Then, the mixture is allowed to react at a temperature of 150° C. or higher for 10 minutes or more under a high pressure. Thereafter, by separating unreacted components and a (meth)acrylic polymer obtained by the reaction from each other using a separator, it is possible to obtain the (meth)acrylic polymer.

Here, if the polymerization initiator is incorporated into the obtained (meth)acrylic polymer, there is a concern that the resultant is inferior in storage stability. For that reason, it is preferable that the above-described reaction is carried out while distilling off the solvent, or after separating the (meth)acrylic polymer, the solvent is distilled off.

Examples of the acrylic or methacrylic monomer which is used as the raw material of the (meth)acrylic polymer include (meth)acrylic acid; α-ethylacrylic acid; ester based (meth)acrylates such as methyl (meth)acrylate, n-propyl (meth)acrylate, isopropyl (meth)acrylate, n-butyl (meth) acrylate, sec-butyl (meth)acrylate, tert-butyl (meth)acrylate, 2-ethylbutyl (meth)acrylate, 1,3-dimethylbutyl (meth)acrylate, hexyl (meth)acrylate, 2-ethylhexyl (meth)acrylate, octyl (meth)acrylate, 3-ethoxypropyl (meth)acrylate, 3-ethoxybutyl (meth)acrylate, dimethylaminoethyl (meth) acrylate, 2-hydroxyethyl (meth)acrylate, hydroxybutyl (meth)acrylate, α-(hydroxymethyl)ethyl (meth)acrylate, phenyl (meth)acrylate, benzyl (meth)acrylate, phenylethyl (meth)acrylate, etc.; and the like. The above-described acrylic or methacrylic monomers can be used solely or in combination of two or more kinds thereof.

As other polymerizable monomer which may be copolymerized with the acrylic or methacrylic monomer, a known compound having an unsaturated double bond can be used. Examples thereof include styrene: 3-nitrostyrene; 4-methoxystyrene; alkylstyrenes such as α-methylstyrene, β-methylstyrene, 2,4-dimethylstyrene, vinyltoluene, α-ethylstyrene, α-butylstyrene, α-hexylstyrene, etc.; halogenated styrenes such as 4-chlorostyrene, 3-chlorostyrene, 3-bromostyrene, etc.; and carboxylic acids having an unsaturated double bond, such as crotonic acid, α-methylcrotonic acid, α-ethylcrotonic acid, isocrotonic acid, maleic acid, fumaric acid, itaconic acid, citraconic acid, mesaconic acid, glutaconic acid, etc.

Of these, from the standpoints of solubility with other components of the composition and adhesion of a cured product, as the acrylic or methacrylic monomer, C1-C10-alkyl (meth)acrylates such as methyl (meth)acrylate, n-butyl (meth)acrylate, 2-ethylhexyl (meth)acrylate, octyl (meth) acrylate, etc., and C1-C10-alkyl (meth)acrylates having a hydroxyl group, such as 2-hydroxyethyl (meth)acrylate, hydroxybutyl (meth)acrylate etc., are preferable; and as the other polymerizable monomer, styrene or the like is preferable.

In the present invention, a weight average molecular weight of the (meth)acrylic polymer is from 1,500 to 30,000, preferably from 3,000 to 20,000, and especially preferably from 5,000 to 15,000. In the case where the weight average molecular weight is less than 1,500, adhesion of a cured product tends to be inferior, whereas in the case where it is more than 30,000, the (meth)acrylic polymer is hardly dissolved in other monomers or becomes cloudy, and hence, such is not preferable.

The (meth)acrylic polymer is also easily available as a goods on the market. Examples thereof include "ARUFON Series", manufactured by Toagosei Co., Ltd., which are available as a product name of UP-1170 or UH-2190.

In the case of using the (meth)acrylic polymer, a content proportion of the (meth)acrylic polymer in the ultraviolet-curable adhesive composition of the present invention is usually from 5% by weight to 95% by weight, preferably from 5% by weight to 85% by weight, and more preferably from about 10% by weight to 70% by weight.

In the ultraviolet-curable adhesive of the present invention, it is preferable to contain the softening component (D); and as for the softening component (D), it is more preferable to contain at least one member of a polyether compound and a hydroxyl group-containing polyisoprene-based oligomer or polymer, and it is especially preferable to contain polyethylene glycol-polypropylene glycol allyl butyl ether or hydroxyl group-containing polyisoprene.

At that time, a content proportion of at least one member of a polyether compound and a hydroxyl group-containing polyisoprene-based oligomer or polymer, and more preferably polyethylene glycol-polypropylene glycol allyl butyl ether or hydroxyl group-containing polyisoprene in the ultraviolet-curable adhesive of the present invention is usually from 10 to 80% by weight, preferably from 10 to 70% by weight, and more preferably from 30 to 70% by weight.

In the ultraviolet-curable adhesive of the present invention, in addition to the above-described components, additives such as an organic solvent, a coupling agent, a polymerization inhibitor, a levelling agent, an antistatic agent, a surface lubricant, a light stabilizer (for example, a hindered amine compound, etc.), etc. may be further added, if desired.

Specific examples of the organic solvent include alcohols such as methanol, ethanol, isopropyl alcohol, etc., dimethyl sulfone, dimethyl sulfoxide, tetrahydrofuran, dioxane, toluene, xylene, and the like.

Examples of the coupling agent include a silane coupling agent, a titanium-based coupling agent, a zirconium-based coupling agent, an aluminum-based coupling agent, and the like. Specific examples of the silane coupling agent include 3-glycidoxypropyltrimethoxysilane, 3-glycidoxypropylmethyldimethoxysilane, 3-glycidoxypropylmethyldimethoxysilane, 2-(3,4-epoxycyclohexyl)ethyltrimethoxysilane, N-(2-aminoethyl)3-aminopropylmethyldimethoxysilane, γ-mercaptopropyltrimethoxysilane, N-(2-aminoethyl)3-aminopropylmethyltrimethoxysilane, 3-aminopropyltriethoxysilane, 3-mercaptopropyltrimethoxysilane, vinyltrimethoxysilane, N-(2-vinylbenzylamino)ethyl)3-aminopropyltrimethoxysilane hydrochloride, 3-methacryloxypropyltrimethoxysilane, 3-chloropropylmethyldimethoxysilane, 3-chloropropyltrimethoxysilane, and the like.

Specific examples of the titanium-based coupling agent include isopropyl (N-ethylaminoethylamino)titanate, isopropyltriisostearoyl titanate, titanium di(dioctylpyrophosphate) oxyacetate, tetraisopropyl di(dioctylphosphite)titanate, a neoalkoxytri(p-N-(β-aminoethyl)aminophenyl) titanate, and the like.

Specific examples of the zirconium-based or aluminum-based coupling agent include Zr-acetylacetonate, Zr-methacrylate, Zr-propionate, a neoalkoxy zirconate, a neoalkoxy trisneodecanoyl zirconate, a neoalkoxytris(dodecanoyl)benzenesulfonyl zirconate, a neoalkoxytris(ethylenediaminoethyl)zirconate, a neoalkoxytris(m-aminophenyl)zirconate, ammonium zirconium carbonate, Al-acetylacetonate, Al-methacrylate, Al-propionate, and the like.

Specific examples of the polymerization inhibitor include p-methoxyphenol, methylhydroquinone, and the like.

Specific examples of the light stabilizer include hindered amine-based compounds such as 1,2,2,6,6-pentamethyl-4-piperidyl alcohol, 2,2,6,6-tetramethyl-4-piperidyl alcohol, 1,2,2,6,6-pentamethyl-4-piperidyl (meth)acrylate (a product name: LA-82, manufactured by ADEKA Corporation, tetrakis(1,2,2,6,6-pentamethyl-4-piperidyl)-1,2,3,4-butanetetracarboxylate, tetrakis(2,2,6,6-tetramethyl-4-piperidyl)-1,2, 3,4-butanetetracarboxylate, a mixed esterification product of 1,2,3,4-butanetetracarboxylic acid with 1,2,2,6,6-pentamethyl-4-piperidinol and 3,9-bis(2-hydroxy-1,1-dimethylethyl)-2,4,8,10-tetraoxaspiro[5,5]undecane, decanedioic acid bis(2,2,6,6-tetramethyl-4-piperidyl)sebacate, bis(1-undecanoxy-2,2,6,6-tetramethylpiperidin-4-yl)carbonate, 2,2, 6,6-tetramethyl-4-piperidyl methacrylate, bis(2,2,6,6-tetramethyl-4-piperidyl)sebacate, bis(1,2,2,6,6-pentamethyl-4-piperidyl)sebacate, 4-benzoyloxy-2,2,6,6-tetramethylpiperidine, 1-[2-[3-(3,5-di-tert-butyl-4- hydroxyphenyl)propionyloxy]ethyl]-4-[3-(3,5-di-tert-butyl-4-hydroxyphenyl)propionyloxy]-2,2,6,6-tetramethylpiperidine, 1,2,2,6,6-pentamethyl-4-piperidinyl (meth)acrylate, bis(1,2,2,6,6-pentamethyl-4-piperidinyl)[[3,5-bis(1,1-dimethylethyl)-4-hydroxyphenyl]methyl]butyl malonate, decanedioic acid bis(2,2,6,6-tetramethyl-1(octyloxy)-4-piperidinyl) ester, a reaction product of 1,1,-dimethylethyl hydroperoxide and octane, N,N',N'',N'''-tetrakis (4,6-bis(butyl(N-methyl-2,2,6,6-tetramethylpiperidin-4-yl) amino)triazin-2-yl)-4,7-diazadecane-1,10-diamine, a polycondensate of dibutylamine 1,3,5-triazine-N,N'-bis(2,2,6,6-tetramethyl-4-piperidyl-1,6-hexamethylenediamine and N-(2,2,6,6-tetramethyl-4-piperidyl)butylamine, poly[[6-(1,1,3,3-tetramethylbutyl)amino-1,3,5-triazine-2,4-diyl][2,2,6,6-tetramethyl-4-piperidyl)imino]hexamethylene[(2,2,6,6-tetramethyl-4-piperidyl)imino]], a polymerization product of dimethyl succinate and 4-hydroxy-2,2,6,6-tetramethyl-1-piperidine ethanol, 2,2,4,4-tetramethyl-20-(β-lauryloxycarbonyl)ethyl-7-oxa-3,20-diazadispiro[5,1,11,2]heneicosan-21-one, β-alanine, N,-(2,2,6,6-tetramethyl-4-piperidinyl)-dodecyl ester/tetradecyl ester, N-acetyl-3-dodecyl-1-(2,2,6,6-tetramethyl-4-piperidinyl)pyrrolidine-2,5-dione, 2,2,4,4-tetramethyl-7-oxa-3,20-diazadispiro[5,1,11,2]heneicosan-21-one, 2,2,4,4-tetramethyl-21-oxa-3,20-diazadicyclo-[5,1,11,2]-heneicosane-20-propanoic acid dodecyl ester/tetradecyl ester, propanedioic acid-[(4-methoxyphenyl) methylene]bis(1,2,2,6,6-pentamethyl-4-piperidinyl) ester, a higher fatty acid ester of 2,2,6,6-tetramethyl-4-piperidinol, 1,3-benzenedicarboxyamide-N,N'-bis(2,2,6,6-tetramethyl-4-piperidinyl), etc.; benzophenone-based compounds such as octabenzone, etc.; benzotriazole-based compounds such as 2-(2H-benzotriazol-2-yl)-4-(1,1,3,3-tetramethylbutyl) phenol, 2-(2-hydroxy-5-methylphenyl)benzotriazole, 2-[2-hydroxy-3-(3,4,5,6-tetrahydrophthalimido-methyl)-5-methylphenyl]benzotriazole, 2-(3-tert-butyl-2-hydroxy-5-methylphenyl)-5-chlorobenzotriazole, 2-(2-hydroxy-3,5-di-tert-pentylphenyl)benzotriazole, a reaction product of methyl 3-(3-(2H-benzotriazol-2-yl)-5-tert-butyl-4-hydroxyphenyl)propionate and polyethylene glycol, 2-(2H-benzotriazol-2-yl)-6-dodecyl-4-methylphenol, etc.; benzoate-based compounds such as 2,4-di-tert-butylphenyl-3,5-di-tert-butyl-4-hydroxybenzoate, etc.; triazine-based compounds such as 2-(4,6-diphenyl-1,3,5-triazin-2-yl)-5-[(hexyl)oxy]phenol, etc.; and the like.

In particular, hindered amine-based compounds am preferable as the light stabilizer.

A content of the above-described various additives which are added, if desired, in a total amount of the ultraviolet-curable adhesive is from about 0 to 3% by weight in terms of a total amount of the above-described additives. In the case of using the additives, a content proportion of the additives in a total amount of the ultraviolet-curable adhesive is from 0.01 to 3% by weight, preferably from 0.01 to 1% by weight, and more preferably from 0.02 to 0.5% by weight in terms of a total amount of the above-described additives.

A preferred composition of the ultraviolet-curable adhesive of the present invention is as follows. It is to be noted that the term "% by weight" in the content of each component expresses a content proportion relative to a total amount of the ultraviolet-curable adhesive.

An ultraviolet-curable adhesive containing from 0.001 to 5% by weight, preferably from 0.001 to 1% by weight, and more preferably from 0.001 to 0.1% by weight of the compound (A);

from 5 to 99.8% by weight, preferably from 10 to 95% by weight, more preferably from 20 to 90% by weight, and most preferably from 30 to 80% by weight of the photopolymerizable compound (B); and from 0.01 to 5% by weight, and preferably from 0.2 to 3% by weight of the photopolymerization initiator (C).

In the above-described case, a total sum of the component (A) and the component (C) is preferably at least 0.2% by weight, and more preferably from 0.2 to 5% by weight.

In the foregoing, in the case of using, as the photopolymerizable compound (B), a combination of the (meth) acrylate oligomer (B-1-1) and the monofunctional (meth) acrylate monomer (B-1-2), amounts of the both components which can be contained are as follows.

(Meth)acrylate oligomer (B-1-1): Usually from 5 to 90% by weight, preferably from 20 to 80% by weight, and more preferably from 25 to 50% by weight.

Monofunctional (meth)acrylate monomer (B-1-2): Usually from 5 to 70% by weight, and preferably from 5 to 50% by weight.

In the above, a total sum of the both components falls within the range of the above-described content of the component (B).

In the above-described case, when the total sum of the combination of preferred members is less than 100% by weight is corresponding to the case where the remainder is composed of components other than those described above (for example, the above-described component (D) or the above-described various additives).

In the case of containing the softening component (D), a proportion of the component (D) is usually from about 30 to 200 parts by weight, and preferably from about 50 to 150 parts by weight based on 100 parts by weight of the above-described photopolymerizable compound (B). In addition, a total sum of the component (A) and the component (C) is usually from about 0.1 to 5 parts by weight, and preferably from about 0.2 to 2 parts by weight based on 100 parts by weight of a total sum of the component (B) and the component (D).

The ultraviolet-curable adhesive of the present invention having the above-described composition and further containing the softening component (D) in a content proportion of from 10 to 80% by weight, and preferably from 10 to 70% by weight is more preferable.

Some preferred embodiments in the ultraviolet-curable adhesive of the present invention are described below. The term "% by weight" in the content of each component expresses a content proportion relative to a total amount of the ultraviolet-curable adhesive of the present invention.

(I)

An ultraviolet-curable adhesive in which the content of the compound (A) represented by the foregoing formula (1) is from 0.001 to 5% by weight, and the content of the photopolymerization initiator (C) is from 0.01 to 5% by weight, with the remainder being composed of the photopolymerizable compound (B) and other components.

(II)

The ultraviolet-curable adhesive as set forth above in (I), in which the content of the photopolymerizable compound (B) is from 5 to 99.8% by weight.

(III)

The ultraviolet-curable adhesive as set forth above in any one of (13) to (28) in the section of "MEANS FOR SOLVING PROBLEMS" and (I) and (II), in which in the compound (A) represented by the foregoing formula (1), a total sum of t1 and t2 is 2.

(IV)

The ultraviolet-curable adhesive as set forth above in any one of (I) to (III), in which the compound (A) is any one of the compounds described in (i) to (iv) exemplified as preferred compounds of the above-described compound (A).

(V)

The ultraviolet-curable adhesive as set forth above in any one of (I) to (III), in which the compound (A) is at least one member selected from 2-(4-biphenyl)-5-(4-tert-butylphenyl)-1,3,4-oxadiazole, 1,3-bis[2-(2,2'-bipyridin-6-yl)-1,3,4-oxadiazo-5-yl]benzene, 6,6'-bis[5-(biphenyl-4-yl)-1,3,4-oxadiazo-2-yl]2,2'-bipyridyl, and 1,3-bis[2-(4-tert-butylphenyl)-1,3,4-oxadiazo-5-yl]benzene.

(VI)

The ultraviolet-curable adhesive as set forth above in any one of (I) to (V), which contains, as the photopolymerizable compound (B), both the above-described (meth)acrylate oligomer (B-1-1) and the above-described monofunctional (meth)acrylate monomer (B-1-2).

(VII)

The ultraviolet-curable adhesive as set forth above in (VI), which contains, as the (meth)acrylate oligomer (B-1-1), a urethane (meth)acrylate oligomer which is obtained through, a reaction among three members of polypropylene glycol, isophorone diisocyanate, and 2-hydroxyethyl (meth)acrylate, or an esterification product oligomer between a maleic anhydride adduct of an isoprene polymer and 2-hydroxyethyl methacrylate; and contains, as the monofunctional (meth)acrylate monomer (B-1-2), dicyclopentenyloxyethyl (meth)acrylate or dicyclopentanyl (meth)acrylic.

(VIII)

The ultraviolet-curable adhesive as set forth above in any one of (I) to (VII), in which the photopolymerization initiator (C) has an absorption coefficient per unit weight at 365 nm as measured in acetonitrile of from 85 to 10,000 mL/(g·cm) and an absorption coefficient per unit weight at 405 nm as measured in acetonitrile of from 5 to 3,000 mL/(g·cm).

(IX)

The ultraviolet-curable adhesive as set forth above in any one of (I) to (VIII), in which the photopolymerization initiator (C) is 2,4,6-trimethylbenzoyldiphenylphosphine oxide.

(X)

The ultraviolet-curable adhesive as set forth above in any one of (I) to (IX), which further contains the softening component (D) in a proportion of from 10 to 80% by weight.

(XI)

The ultraviolet-curable adhesive as set forth above in (X), which contains, as the softening component (D), polyethylene glycol-polypropylene glycol allyl butyl ether or hydroxyl group-containing polyisoprene.

(XII)

The ultraviolet-curable adhesive as set forth above in any one of (I) to (IX), in which the content proportion of the compound (A) is from 0.001 to 5% by weight;

the urethane (meth)acrylate oligomer (B-1-1a) or the oligomer (B-1-1b) is contained as the (meth)acrylate oligomer (B-1-1), and the content thereof is from 5 to 90% by weight;

the content proportion of the monofunctional (meth)acrylate monomer (B-1-2) is from 5 to 70% by weight;

the content proportion of the photopolymerization initiator (C) is from 0.01 to 5% by weight; and the softening component (D) is further contained in a proportion of from 10 to 80% by weight.

The ultraviolet-curable adhesive of the present invention can be obtained by mixing and dissolving the compound (A) represented by the foregoing formula (1), the photopolymerizable compound (B), and the photopolymerization initiator (C), and if desired, further the softening component (D) and each of the above-described components as the arbitrary additives described above at from ordinary temperature (25° C.) to 80° C. In addition, if desired, impurities may be removed by means of an operation such as filtration, etc.

Taking into consideration coating properties, it is preferable that the ultraviolet-curable adhesive of the present invention has a viscosity at 25° C. of from 100 mPa·s to 100 Pa·s, and it is especially preferable to properly control a blending ratio of the components such that the viscosity is in the range of from 300 to 50,000 mPa·s.

In the present invention, from the viewpoint of ensuring high image visibility, a proportion of an insoluble solid component contained in the ultraviolet-curable adhesive is preferably not more than 10% by weight, more preferably not more than 5% by weight, and especially preferably not more than 1% by weight relative to the ultraviolet-curable adhesive.

The ultraviolet-curable adhesive of the present invention can be formed into a cured product of the present invention by irradiation with an ultraviolet ray. In general, as described later, the ultraviolet-curable adhesive of the present invention is coated on at least one surface of at least one base material of plural optical base materials to be laminated, and after laminating the base materials, the adhesive is cured by irradiation with an ultraviolet ray from the side of the transparent base material.

A curing shrinkage ratio of the cured product of the ultraviolet-curable adhesive of the present invention is preferably not more than 5.0%, and especially preferably not more than 3.0%. According to this, on the occasion of curing of the ultraviolet-curable adhesive, it is possible to decrease an internal stress to be accumulated in the resin cured product, and it is possible to effectively prevent formation of a strain at an interface between the base material and the layer made of the eared product of the ultraviolet-curable adhesive. In addition, in the case where the base material such as glass, etc. is thin, if the curing shrinkage ratio is large, warpage at the time of curing becomes large, and therefore, the display performance is significantly adversely affected. From this viewpoint, it is also preferable that the curing shrinkage ratio is smaller.

In the case where it is required to obtain an optical member having high transparency and good visibility of a displayed image or the like by using the ultra-violet-curable adhesive of the present invention, it is preferable that the cured product of the ultraviolet-curable adhesive of the present invention (a cured product having a film thickness of, for example, 200 μm, which, however, varies with an application) has a transmittance of light in its wavelength region of from 400 nm to 800 nm of 80% or more. This is because in the case where the transmittance of light in the wavelength region of from 400 nm to 800 nm is too low, the visible light hardly transmits, so that visibility of a displayed image in a display device containing the instant cured product is lowered.

In addition, when the transmittance of light at 400 nm in the cured product is high, an enhancement of the visibility of a displayed image can be much more expected. Therefore, the transmittance of light at 400 nm of the cured product of the ultraviolet-curable adhesive of the present invention (a cured product having a film thickness of, for example, 200 μm, which, however, varies with an application) is preferably 80% or more, and especially preferably 90% or more.

An optical member of the present invention which is obtained by using the above-described ultraviolet-curable adhesive of the present invention can be obtained in the following manner.

The optical member of the present invention can be obtained by coating the ultraviolet-curable adhesive of the present invention on one of optical base materials by using a coating apparatus such a slit coater, a roll coater, a spin coater, an apparatus for screen printing method, etc., such that a film thickness of the coated resin is from 10 to 300 μm, laminating the other optical base material on the coated surface, and curing the adhesive by irradiation with an active energy ray from the side of the transparent base material, thereby adhering the optical base materials to each other. At that time, examples of the active energy ray include ultraviolet to near-ultraviolet light rays (wavelength: from around 200 to 400 nm). An irradiation dose of the active energy ray is preferably from about 100 to 4,000 mJ/cm$^2$, and especially preferably from 200 to 3,000 mJ/cm$^2$.

A light source which is used for the irradiation with ultraviolet to near-ultraviolet light rays is not limited with respect to the kind of a light source so long as it is a lamp capable of irradiating ultraviolet to near-ultraviolet light rays, and preferably light rays at a wavelength of from around 200 to 400 nm. Examples thereof include a low-pressure, high-pressure, or ultrahigh-pressure mercury vapor lamp, a metal halide lamp, a (pulsed) xenon lamp, an electrodeless lamp, and the like. In view of the facts that an output at a wavelength of from 300 nm to 400 nm is high; curing of the ultraviolet-curable resin composition becomes fast; and excitation of the compound (A) is easy to occur, it is preferable to use a metal halide lamp as the light source.

As the optical base material for which the ultraviolet-curable adhesive for optical base material lamination of the present invention can be used, a transparent plate, a sheet, a touch panel, and a display body can be exemplified.

A thickness of a plate-like or sheet-like optical base material such as a transparent plate or sheet (preferably a transparent sheet), etc. is not particularly limited, and it is usually from about 5 μm to about 5 cm, preferably from about 10 μm to about 10 mm, and more preferably from about 50 μm to 3 mm.

In particular, the ultraviolet-curable adhesive of the present invention can be suitably used as an adhesive for laminating plural transparent plates or sheets constituting a touch panel.

In the case where the term "optical base material" is merely referred to in the present specification, the instant optical base material includes both an optical base material not having a light-shielding portion on a surface thereof and an optical base material having a light-shielding portion on a surface thereof. In the optical base material having a light-shielding portion on a surface thereof, the light-shielding portion may be formed on both surfaces or one surface of the optical base material, and it may be formed in a part or the whole of both surfaces or one surface of the optical base material. It is to be noted that it is preferable that the light-shielding portion is not formed in at least a part of the laminated optical base materials, but an exposing portion through which an ultraviolet ray transmits exists.

One of preferred embodiments of the present invention is concerned with the case where at least one of two optical base materials to be laminated is an optical base material having a light-shielding portion in a part of a surface thereof. In that case, it is possible to obtain the optical member of the present invention, such as a touch panel, etc., by laminating the two optical base materials to each other with the ultraviolet-curable adhesive of the present invention and then irradiating an ultraviolet ray from the side where the optical base material having a light-shielding portion exists, thereby curing the adhesive. In the thus obtained optical member of the present invention, even in the case where an ultraviolet ray is irradiated from one direction, the adhesive in the light-shielding area where the ultraviolet ray does not reach is thoroughly cured. For that reason, in various display devices having the instant optical member, it is possible to suppress generation of uneven display or the like in the vicinity of the light-shielding portion.

In the optical base material having a light-shielding portion in a part of a surface thereof, a position of the light-shielding portion is not particularly limited. A preferred embodiment is concerned with the case where a stripe-like light-shielding portion having a width of from 0.05 mm to 20 mm, preferably from about 0.05 mm to 10 mm, more preferably from 0.1 mm to 8 mm, and still more preferably from about 0.1 mm to 6 mm is provided in the periphery of the optical base material.

As the transparent plate or sheet for which the ultraviolet-curable adhesive of the present invention is used transparent plates or sheets using a variety of materials can be used. Specifically, it is possible to use a transparent plate or sheet which is made of a resin such as polyethylene terephthalate (PET), polycarbonate (PC), polymethyl methacrylate (PMMA), a composite of PC and PMMA, glass, a cycloolefin copolymer (COC), a cycloolefin polymer (COP), triacetyl cellulose (TAC), an acrylic resin, etc., or a functional transparent laminated plate or sheet prepared by laminating a plurality of the foregoing transparent plates or sheets, such as a polarizing plate, etc.; a transparent plate made of inorganic glass (for example, an inorganic glass plate or its processed goods (e.g., a lens, a prism, or an ITO glass)); or the like.

In addition, in the present invention, the plate-like or sheet-like optical base material includes, in addition to the above-described polarizing plate and the like, a laminate of plural functional plates or sheets (hereinafter also referred to as "functional laminate"), such as a touch panel, a display body, e.g., a liquid crystal display plate or LED, etc.

A plate-like or sheet-like optical base material is preferable as the optical base material in the present invention.

Examples of the sheet for which the ultraviolet-curable adhesive of the present invention can be used (for example, a sheet to be laminated on a touch panel, etc., or the like) include an icon sheet, a decorative sheet, and a protective sheet. Examples of the plate for which the ultraviolet-curable adhesive of the present invention can be used (transparent plate: for example, a transparent plate to be laminated on a touch panel, etc., or the like) include a decorative plate and a protective plate. As a material of the instant sheet or plate, those exemplified as the material of the transparent plate as described above can be applied.

Examples of the material of the surface of the touch panel, for which the ultraviolet-curable adhesive of the present invention can be used, include glass, PET, PC, PMMA, a composite of PC and PMMA, COC, and COP.

As one of the preferred optical members obtained by the present invention, an optical member in which a plate-like or sheet-like transparent optical base material having a light-shielding portion in a part thereof (preferably the periphery) is laminated to the above-described functional laminate with the cured product of the ultraviolet-curable resin of the present invention can be exemplified. As preferred examples thereof, a touch panel (or a touch panel sensor) in which the above-described transparent plate or sheet having a stripe-like light-shielding portion in the periphery is laminated on a surface on the side of a touch sensor of a touch panel with a cured product of the ultraviolet-curable resin of the present invention; or a display device in which a plate-like or sheet-like transparent optical base material having a light-shielding portion in a part thereof (preferably the periphery), such as a protective plate, etc., is laminated on a display screen of a display body with the cured product of the ultraviolet-curable resin of the present invention can be exemplified.

The ultraviolet-curable adhesive of the present invention can also be suitably used for the production of a display body having an optical functional material stuck thereto (hereinafter also referred to as "display panel"), which is obtained by laminating a display body such as a liquid crystal display device, etc. and an optical functional material (optical base material in the present invention) to each other. At that time, examples of the display body which can be used include display devices having a polarizing plate laminated thereon, such as LCD, EL display, EL illumination, electronic paper, plasma display, etc. In addition, examples of the optical functional material which can be used for the production of various display panels include a transparent plastic plate such as an acrylic plate, a PC plate, a PET plate, a PEN (polyethylene naphthalate) plate, etc.; tempered glass, and a touch panel input sensor (touch panel sensor). Such a functional material preferably has a light-shielding portion in a part thereof (usually the periphery).

In the case of laminating a display body and a transparent plate or a sheet to each other with the ultraviolet-curable adhesive of the present invention, when a refractive index of a cured product obtained by curing the ultraviolet-curable adhesive of the present invention is from 1.45 to 1.55, visibility of a displayed image is more improved, and therefore, such is more preferable.

So long as the refractive index falls within the foregoing range, a difference in the refractive index from the base material which is used as a transparent plate can be decreased, and it becomes possible to decrease a light loss by suppressing diffuse reflection of light.

As preferred embodiments of the optical member of the present invention, the following embodiments (i) to (iv) can be exemplified.

(i) An optical member, in which in the invention set forth in (1) in the section of "Means for Solving the Problem", the ultraviolet-curable adhesive is the ultraviolet-curable adhesive as set forth in any one of (13) to (28) and (31), or the ultraviolet-curable adhesive as set forth in any one of (I) to (XII) as described above as preferred embodiments in the ultraviolet-curable adhesive of the present invention.

(ii) The optical member as set forth above in (i), in which the optical member having a light-shielding portion on a surface thereof is a plate-like or sheet-like transparent optical base material having a light-shielding portion in a part thereof (preferably the periphery).

(iii) An optical member, in which the other optical member to be laminated to the optical member having a light-shielding portion on a surface thereof is the above-described functional laminate.

(iv) An optical member, in which the above-described functional laminate is a touch panel or a display body.

The optical member obtained by using the ultraviolet-curable adhesive of the present invention can be suitably used for a display device such as a liquid crystal display, a plasma display, an organic EL display, etc., and in particular, it can be suitably used for a touch panel in which a position input device is combined with such a display device.

In addition, the optical member obtained by using the ultraviolet-curable adhesive of the present invention, such as the above-described display panel, etc., can be incorporated into an electronic appliance (electronic appliance for display), for example, a television, a small-sized game machine, a cellular phone, a personal computer, etc.

EXAMPLES

The present invention is more specifically described below by reference to the following Examples, but it should be construed that the present invention is not limited to these Examples by any means.

Ultraviolet-curable resin compositions each composed of a composition shown in Table 1 were prepared as Examples 1 to 6 and Comparative Examples 1 to 2. Melting points of all of the respective compounds used as the compound (A) fall within the range of from 25 to 300° C.

TABLE 1

| Component | | | Comparative Example 1 | Comparative Example 2 | Example 1 | Example 2 | Example 3 | Example 4 | Example 5 | Example 6 |
|---|---|---|---|---|---|---|---|---|---|---|
| (B-1) | (B-1-1) | UC-203 | 26 | | 26 | | | | | |
| | | UA-1 | | 35 | | 35 | 35 | 35 | 35 | 35 |
| | (B-1-2) | FA-513M | 16 | | 16 | | | | | |
| | | FA-S12AS | | 20 | | 20 | 20 | 20 | 20 | 20 |
| (C) | | SPEEDCURE TPO | 0.5 | 0.5 | 0.5 | 0.5 | 0.5 | 0.5 | 0.5 | 0.5 |
| (A) | | PBD | | | 0.02 | 0.02 | | | | 0.02 |
| | | Bpy-OXD | | | | | 0.02 | | | |
| | | Bpy-OXD-Bpy | | | | | | 0.02 | | |
| | | OXD-7 | | | | | | | 0.02 | |
| | | Poly ip | 58 | | 58 | | | | | |
| | | UNISAFE PKA-5017 | | 40 | | 40 | 40 | 40 | 40 | 40 |
| | | Total | 100.5 | 95.5 | 100.52 | 95.52 | 95.52 | 95.52 | 95.52 | 95.52 |
| | | Curing distance of light-shielding portion [μm] | C | C | B | A | B | B | B | A |
| | | | 321 | 335 | 827 | 1520 | 598 | 661 | 661 | 1450 |
| | | Transmittance (at 400 nm) [%] | 91.3 | 91.4 | 91 | 91.3 | 91.1 | 91.3 | 91.2 | 91.4 |

It is to be noted that each of the components expressed with abbreviations in Table 1 are as follows.
(Meth)acrylate Oligomer (B-1-1):
UC-203: An esterification product between a maleic anhydride adduct of a polyisoprene polymer and 2-hydroxymethyl methacrylate (average molecular weight: 35,000), manufactured by Kuraray Co., Ltd.
UA-1: A reaction product prepared through a reaction among three components of polypropylene glycol (molecular weight: 3,000), isophorone diisocyanate, and 2-hydroxyethyl acrylate in a molar ratio of 1/1.3/2
Monofunctional (Meth)acrylate Monomer (B-1-2):
FA-513M: Dicyclopentanyl methacrylate, manufactured by Hitachi Chemical Co., Ltd.
FA-512AS: Dicyclopentenyloxyethyl acrylate, manufactured by Hitachi Chemical Co., Ltd.
Photopolymerization Initiator (C):
SPEEDCURE TPO: 2,4,6-Trimethylbenzoyldiphenylphosphine oxide, manufactured by LAMBSON
Compound (A):
PBD: 2-(4-Biphenyl)-5-(4-tert-butylphenyl)-1,3,4-oxadiazole, manufactured by Wako Pure Chemical Industries, Ltd., absorption maximum wavelength: 272 nm, light emission maximum wavelength: 364 nm
Bpy-OXD: 1,3-Bis[2-(2,2'-bipyridin-6-yl)-1,3,4-oxadiazo-5-yl]benzene, manufactured by Wako Pure Chemical Industries, Ltd., absorption maximum wavelength: 308 nm, light emission maximum wavelength: 351 nm
Bpy-OXD-Bpy: 6,6'-Bis[5-(biphenyl-4-yl)-1,3,4-oxadiazo-2-yl]-2,2'-bipyridyl, manufactured by Wako Pure Chemical Industries, Ltd., absorption maximum wavelength: 319 nm, light emission maximum wavelength: 372 nm
OXD-7: 1,3-Bis[2-(4-tert-butylphenyl)-1,3,4-oxadiazo-5-yl]benzene, manufactured by Wako Pure Chemical Industries, Ltd., absorption maximum wavelength: 292 nm, light emission maximum wavelength: 350 nm
Softening Component (D):
Poly ip: Hydroxyl group-terminated liquid polyisoprene, manufactured by Idemitsu Kosan Co., Ltd.
UNISAFE PKA-5017: Polyethylene glycol-polypropylene glycol allyl butyl ether, manufactured by NOF Corporation The following evaluations were carried out by using the ultraviolet-curable adhesives obtained in Examples 1 to 6 and Comparative Examples 1 to 2.
Measurement of Absorption Wavelength and Light Emission Wavelength A tetrahydrofuran solution of each of the compounds used as the compound (A) in the Examples (concentration: 0.002 wt %) was prepared, and an absorption spectrum of each of the compounds was measured by using a spectrophotometer "UV-3150" (a product name, manufactured by Shimadzu Corporation). A light emission spectrum of each of the compounds used as the compound (A) in the Examples was measured by using a fluorophotometer "F-7000" (a product name, manufactured by Hitachi High-Technologies Corporation, etc.).
Curing Properties of Light-Shielding Portion First of all, a substrate obtained by subjecting the entire surface of one of surfaces of a glass plate having a thickness of 1 mm to a black printing processing to form an ultraviolet light-shielding portion as shown in FIG. 1(a) and a substrate obtained by subjecting a half of the area of one of surfaces of a glass plate having a thickness of 1 mm to a black printing processing to form an ultraviolet light-shielding portion as shown in FIG. 1(b) were prepared. A size of the glass substrates was 42 mm in length and 75 mm in width. Each of the ultraviolet-curable adhesives obtained in Examples 1 to 6 and Comparative Examples 1 to 2 was coated on the surface of each of these substrates on which the ultraviolet light-shielding portion was formed, such that a film thickness after curing was 100 µm. Thereafter, the two substrates were laminated in such a manner that the surfaces of the substrates having the ultraviolet light-shielding portion faced each other.

Figure 2:
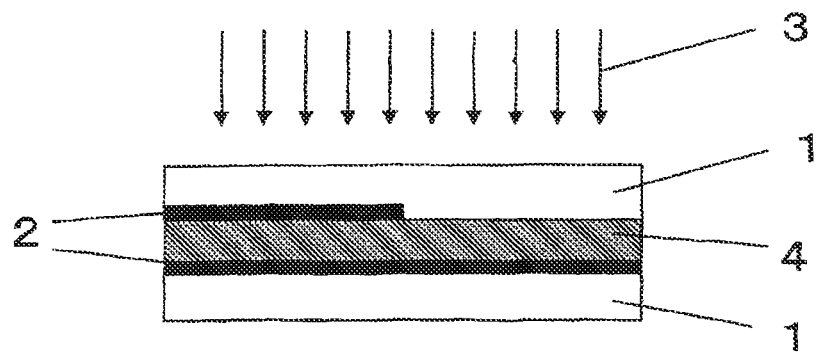
FIG. 2 is a diagrammatic view regarding a method for obtaining an optical member of the present invention in the Examples.
Figure 3:
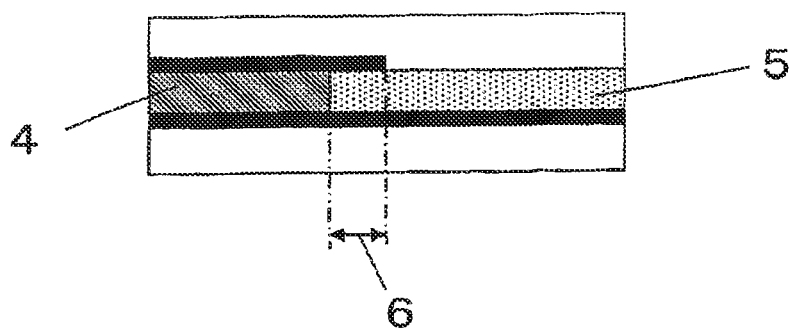
FIG. 3 is a diagrammatic view showing a measurement position of a curing distance of a light-shielding portion measured in the Examples.

Subsequently, the adhesive layer was irradiated with an ultraviolet ray from the side of the substrate in which a half of the area of the one-sided surface was subjected to a black printing processing as shown in FIG. 2. An optical member obtained by using each of the ultraviolet-curable adhesives of Examples 1 to 5 and Comparative Examples 1 to 2 was irradiated with an ultraviolet ray in an accumulated light amount of 3,000 mJ/cm$^2$ by using a high-pressure mercury vapor lamp (80 W/cm, ozone-less). An optical member obtained by using the ultraviolet-curable adhesive of Example 6 was irradiated with an ultraviolet ray in an accumulated light amount of 3,000 mJ/cm$^2$ by using a metal halide lamp (D-type light source (Hg+Fe) metal halide lamp, manufactured by SSR Engineering, Inc., illuminance: 350 mW/cm$^2$). Thereafter, in the adhesive layer of each of the Examples and Comparative Examples, a distance at which curing of the adhesive was advanced from the end of the black printing-processed proportion (curing distance of light-shielding portion) was measured as shown in FIG. 3.

A result of measurement of the curing distance of light-shielding portion in each of the Examples and Comparative Examples and a result of evaluation of transmission properties of light-shielding portion according to the following criteria are shown in Table 1.

A: The curing distance of light-shielding portion is 1,000 µm or more.

B: The curing distance of light-shielding portion is 400 µm or more and less than 1,000 µm.

C: The curing distance of light-shielding portion is less than 400 µm.
Transmittance Two 1 mm-thick slide glasses having a fluorine-based release agent coated thereon were prepared, and the ultraviolet-curable adhesive obtained in each of the Examples and Comparative Examples was coated on the release agent-coated surface of one of the slide glasses such that a film thickness after curing was 200 µm. Thereafter, the two slide glasses were laminated in such a manner that the respective release agent-coated surfaces faced each other. The adhesive layer sandwiched by the slide glasses was irradiated with an ultraviolet ray in an accumulated light amount of 2,000 mJ/cm$^2$ through the glass by using a high-pressure mercury vapor lamp (80 W/cm, ozone-less). Thereafter, the two slide glasses were separated from each other, thereby fabricating a cured product for measurement of transparency. With respect to the transparency of the cured product, a transmittance in the range of from 400 to 800 nm was measured by using a spectrophotometer (a product name: U-3310, manufactured by Hitachi High-Technologies Corporation). As a result, in all of Examples 1 to 6, the transmittance in the range of from 400 to 800 nm was 80% or more.

A result of measurement of the transmittance at 400 nm of the cured product of each of the Examples and Comparative Examples and a result of evaluation of transmittance at 400 nm according to the following criteria are shown in Table 1.

It was confirmed from the results of Table 1 that the ultraviolet-curable adhesives of Examples 1 to 6 of the present invention, each of which contains the compound (A)

represented by the foregoing formula (1), the photopolymerizable compound (B), and the photopolymerization initiator (C), are an ultraviolet-curable adhesive which even in the case where a light-shielding portion is formed in a transparent protective plate, is able to advance curing of the adhesive positioned in a light-shielding area where an ultraviolet ray is shielded by the light-shielding portion.

It was confirmed from the results of Table 1 that the cured product of the ultraviolet-curable adhesive of the present invention, which contains the compound (A) represented by the formula (1) of the present invention, the photopolymerizable compound (B), and the photopolymerization initiator (C), has a practically useful and preferable transmittance. That is, in the cured product of Example 1, as compared with the cured product of Comparative Example 1 having the same composition except that the compound (A) is not contained, the transmittance was lowered by only 0.3%. In addition, in the cured products of Examples 2 to 6, as compared with the cured product of Comparative Example 2 having the same composition except that the compound (A) is not contained, the transmittance was lowered by only from 0 to 0.3%. In particular, in the cured product of Example 6, the transmittance was not lowered at all.

Furthermore, in all of the cured products of Examples 1 to 6, the transmittance was 90% or more, and an excellent optical performance was revealed.

In addition, the following performance evaluations were carried out by using the ultraviolet-curable compositions of the present invention obtained in Examples 1 to 6.

Shrinkage Ratio

Two 1 mm-thick slide glasses having a fluorine-based release agent coated thereon were prepared, and the ultraviolet-curable adhesive obtained in each of the Examples was coated on the release agent-coated surface of one of the slide glasses such that a film thickness after curing was 200 µm. Thereafter, the two slide glasses were laminated in such a manner that the respective release agent-coated surfaces faced each other. The adhesive layer sandwiched by the slide glasses was irradiated with an ultraviolet ray in an accumulated light amount of 2,000 mJ/cm$^2$ through the glass by using a high-pressure mercury vapor lamp (80 W/cm, ozoneless). Thereafter, the two slide glasses were separated from each other, thereby fabricating a cured product for measurement of film specific gravity.

A specific gravity (DS) of the obtained cured product was measured by the method in conformity with JIS K7112, Method B. More specifically, an appropriate amount of the cured product was put into a pycnometer; a weight of the pycnometer was measured; an immersion liquid was then added thereto to fill the pycnometer; and a weight of the pycnometer containing the cured product and the immersion liquid was measured. In addition, a weight of the pycnometer filled with only the immersion liquid was separately measured. From these results of measurement, a specific gravity of the cured product obtained in each of the Examples was calculated. In addition, with respect to the ultraviolet-curable adhesive before curing of each of the Examples, a liquid specific gravity (DL) at 25° C. was measured. From the results of measurement of DS and DL, a curing shrinkage ratio was calculated according to the following formula.

Curing shrinkage ratio (%)=(DS−DL)/DS×100

As a result, in all of Examples 1 to 6, the curing shrinkage ratio was less than 1.5%.

Flexibility

The obtained ultraviolet-curable resin composition was thoroughly cured and evaluated for flexibility by measuring a durometer E hardness by using a durometer hardness meter (Type E) by the method in conformity with JIS K7215. More specifically, the ultraviolet-curable adhesive of each Example was poured into a cylindrical mold such that a film thickness after curing was 1 cm; subsequently, an ultraviolet ray was irradiated to thoroughly cure the ultraviolet-curable adhesive; and a hardness of the obtained cured product was measured by using a durometer hardness meter (type E). As a result, all of the cured products of the ultraviolet-curable adhesives obtained in Examples 1 to 6 had a durometer E hardness of less than 10 and exhibited excellent flexibility.

(Removal performance)

Each of the ultraviolet-curable adhesives prepared in Examples 2 to 6 was coated on a surface of a resin-made film of a liquid crystal display unit having a size of 3.5 inches such that a film thickness after curing was 250 µm.

Subsequently, a glass substrate having a touch sensor was placed on each of the ultraviolet-curable adhesives and laminated onto the liquid crystal display unit. Finally, an ultraviolet ray was irradiated in an accumulated light amount in the range of from 20 to 1,500 mJ/cm$^2$ from the side of the glass substrate having the touch sensor by using an ultra-high-pressure mercury vapor lamp (TOSCURE (a registered trademark) 752, manufactured by Harison Toshiba Lighting Corporation) to cure the adhesive layer, thereby fabricating an optical member of the present invention.

Then, the optical member was cut with a metal-made wire, thereby separating the resin cured product from the glass substrate having the liquid crystal display unit and the touch sensor. Thereafter, the surface of the resin-made film of the liquid crystal display unit and the surface of the glass substrate were wiped off by a fabric impregnated with isopropyl alcohol, and the presence or absence of the resin cured product attached to the resin-made film and the glass substrate was observed through visual inspection. As a result, even in the case of using the ultraviolet-curable adhesive of any of the Examples, attachment of the resin cured product on the resin-made film or the glass substrate was not confirmed.

EXPLANATIONS OF NUMERALS OR LETTERS

1: Glass plate
2: Black printed portion (ultraviolet light-shielding portion)
3: Ultraviolet ray
4: Ultraviolet-curable adhesive
5: Cured ultraviolet-curable adhesive
6: Curing distance of light-shielding portion

The invention claimed is:
1. An optical member comprising:
a first optical base material;
a second optical base material having a light-shielding portion on a surface thereof; and
a cured product layer,
wherein the first and second optical base materials are adhere to each other via the cured product layer, and
the cured product layer is made of an ultraviolet-curable adhesive containing (A) a compound represented by the following formula (1), (B) a photopolymerizable compound, and (C) a photopolymerization initiator:

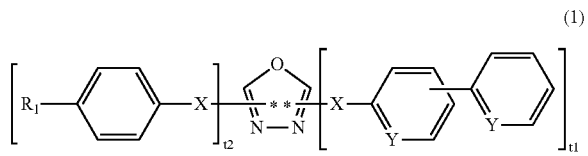

wherein $R_1$ represents an alkyl group having from 1 to 4 carbon atoms; X represents a direct bond or a coupling group represented by the following formula (2):

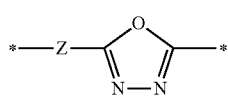

Y represents CH or a nitrogen atom; Z represents a phenylene group, a bipyridine residue, or a fluorene residue; each of t1 and t2 represents an integer of from 0 to 2, provided that t1 and t2 are not 0 at the same time; * represents a coupling site; the coupling site in the formula (1) is bonded to a carbon atom of the oxadiazole skeleton; and in the coupling sites in the formula (2), the left end is bonded to the oxadiazole skeleton, and the right end is bonded to the benzene skeleton or the pyridine skeleton.

2. The optical member according to claim 1, wherein in the compound (A) represented by the formula (1), both t1 and t2 are 1, or one of Xs is a direct bond, with the other being a coupling group represented by the formula (2), and t1 is 2, or t2 is 2.

3. The optical member according to claim 1, wherein in the compound (A) represented by the formula (1), X is a direct bond or a coupling group represented by the formula (2) wherein Z is a phenylene group.

4. The optical member according to claim 1, wherein the compound (A) represented by the formula (1) is one in which one of Xs is a direct bond, with the other being a coupling group represented by the formula (2), and t1 is 2, or t2 is 2.

5. The optical member according to claim 3, wherein the compound (A) represented by the formula (1) is a compound represented by the following formula (3).

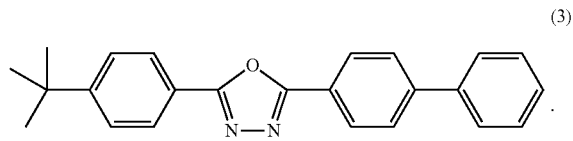 [SMILES: CC(C)(C)c1ccc(-c2nnc(-c3ccc(-c4ccccc4)cc3)o2)cc1]

6. The optical member according to claim 1, wherein the compound (A) represented by the formula (1) is a compound which when measured in tetrahydrofuran, has a maximum wavelength of light absorption spectrum in the range of from 270 nm to 320 nm and a maximum wavelength of light emission spectrum in the range of from 350 nm to 400 nm.

7. The optical member according to claim 1, wherein an absorption coefficient per unit weight of the photopolymerization initiator (C) at 365 nm as measured in acetonitrile is from 400 to 10,000 mL/(g·cm).

8. The optical member according to claim 1, wherein the ultraviolet-curable adhesive contains, as the photopolymerizable compound (B), (B-1) a (meth)acrylate compound.

9. The optical member according to claim 8, wherein the ultraviolet-curable adhesive contains, as the (meth)acrylate compound (B-1), (B-1-1) at least one (meth)acrylate oligomer selected from the group consisting of: a urethane (meth)acrylate oligomer; and a (meth)acrylate oligomer having at least one skeleton of a polyisoprene skeleton and a polybutadiene skeleton.

10. The optical member according to claim 8, wherein the ultraviolet-curable adhesive contains, as the (meth)arylate compound (B-1), (B-1-2) a monofunctional (meth)acrylate monomer.

11. A touch panel comprising the optical member according to claim 1.

12. An ultraviolet-curable adhesive to be used for laminating a first optical base material and a second optical base material having a light-shielding portion on a surface thereof to each other, the ultraviolet-curable adhesive comprising:
(A) a compound represented by the following formula (1);
(B) a photopolymerizable compound; and
(C) a photopolymerization initiator:

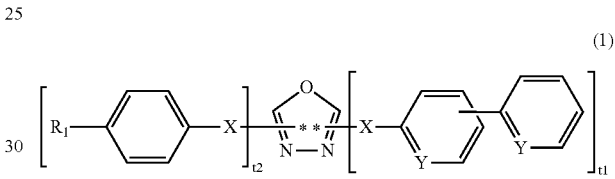

wherein $R_1$ represents an alkyl group having from 1 to 4 carbon atoms; X represents a direct bond or a coupling group represented by the following formula (2):

Y represents CH or a nitrogen atom; Z represents a phenylene group, a bipyridine residue, or a fluorene residue; each of t1 and t2 represents an integer of from 0 to 2, provided that t1 and t2 are not 0 at the same time; * represents a coupling site; the coupling site in the formula (1) is bonded to a carbon atom of the oxadiazole skeleton; and in the coupling sites in the formula (2), the left end is bonded to the oxadiazole skeleton, and the right end is bonded to the benzene skeleton or the pyridine skeleton.

13. The ultraviolet-curable adhesive according to claim 12, wherein in the compound (A) represented by the formula (1), X is a direct bond or a coupling group represented by the formula (2) wherein Z is a phenylene group.

14. The ultraviolet-curable adhesive according to claim 12, wherein the compound (A) represented by the formula (1) is one in which one of Xs is a direct bond, with the other being a coupling group represented by the formula (2), and t1 is 2, or t2 is 2.

15. The ultraviolet-curable adhesive according to claim 12, wherein the compound (A) represented by the formula (1) is a compound represented by the following formula (3)

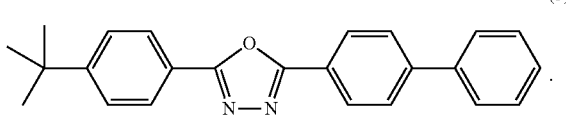

16. The ultraviolet-curable adhesive according to claim 12, wherein the compound (A) represented by the formula (1) is a compound which when measured in tetrahydrofuran, has a maximum wavelength of light absorption spectrum in the range of from 270 nm to 320 nm and a maximum wavelength of light emission spectrum in the range of from 350 nm to 400 nm.

17. The ultraviolet-curable adhesive according to claim 12, wherein an absorption coefficient per unit weight of the photopolymerization initiator (C) at 365 nm as measured in acetonitrile is from 400 to 10,000 mL/(g·cm).

18. The ultraviolet-curable adhesive according to claim 12, which contains, as the photopolymerizable compound (B), (B-1) a (meth)acrylate compound.

19. The ultraviolet-curable adhesive according to claim 18, which contains, as the (meth)acrylate compound (B-1), (B-1-1) at least one (meth)acrylate oligomer selected from the group consisting of: a urethane (meth)acrylate oligomer; and a (meth)acrylate oligomer having at least one skeleton of a polyisoprene skeleton and a polybutadiene skeleton.

20. The ultraviolet-curable adhesive according to claim 18, which contains, as the (meth)arylate compound (B-1), (B-1-2) a monofunctional (meth)acrylate monomer.

21. The ultraviolet-curable adhesive according to claim 12, which contains, as the photopolymerizable compound (B), (i) (B-1-1) at least one (meth)acrylate oligomer selected from the group consisting of: a urethane (meth)acrylate oligomer; and a (meth)acrylate oligomer having at least one skeleton of a polyisoprene skeleton and a polybutadiene skeleton and (ii) (B-1-2) a monofunctional (meth)acrylate monomer.

22. The ultraviolet-curable adhesive according to claim 12, which contains, as the photopolymerizable compound (B), an epoxy compound or an oxetane compound.

23. The ultraviolet-curable adhesive according to claim 12, which further contains other components than the compound (A), the photopolymerizable compound (B) and the photopolymerization initiator (C), and has a content of the compound (A) of from 0.001 to 5% by weight and a content of the photopolymerization initiator (C) of from 0.01 to 5% by weight in a total amount of the ultraviolet-curable adhesive, with the remainder being composed of the photopolymerizable compound (B) and other components.

24. The ultraviolet-curable adhesive according to claim 23, which contains, as the photopolymerizable compound (B), (i) (B-1-1) at least one (meth)acrylate oligomer selected from the group consisting of: a urethane (meth)acrylate oligomer; and a (meth)acrylate oligomer having at least one skeleton of a polyisoprene skeleton and a polybutadiene skeleton and (ii) (B-1-2) a monofunctional (meth)acrylate monomer, and which has a content of the (meth)acrylate oligomer (B-1-1) of from 5 to 90% by weight and a content of the monofunctional (meth)acrylate monomer (B-1-2) of from 5 to 70% by weight in a total amount of the ultraviolet-curable adhesive, with the remainder being composed of other components.

25. The ultraviolet-curable adhesive according to claim 12, which further contains (D) a softening component.

26. The ultraviolet-curable adhesive according to claim 25, wherein a content of the softening component (D) is from 10 to 80% by weight relative to a total amount of the ultraviolet-curable adhesive.

27. The ultraviolet-curable adhesive according to claim 12, wherein the first optical base material and the second optical base material having a light-shielding portion on a surface thereof are used for touch panel.

28. A cured product obtained by irradiating the ultraviolet-curable adhesive according to claim 12 with an active energy ray.

29. A method for producing an optical member obtained by laminating a first optical base material and a second optical base material having the light-shielding portion to each other with the ultraviolet-curable adhesive according to claim 12 and then curing the ultraviolet-curable adhesive by irradiating an active energy ray through the second optical base material having the light-shielding portion.

30. An ultraviolet-curable adhesive comprising (A) a compound represented by the following formula (1):

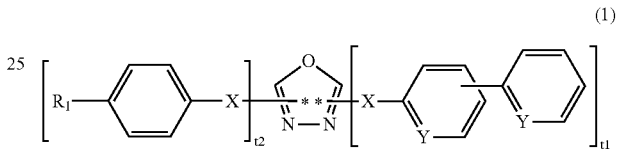

wherein $R_1$ represents an alkyl group having from 1 to 4 carbon atoms; X represents a direct bond or a coupling grou represented by the following formula (2):

Y represents CH or a nitrogen atom; Z represents a phenylene group, a bipyridine residue, or a fluorene residue; each of t1 and t2 represents an integer of from 0 to 2, provided that t1 and t2 are not 0 at the same time; * represents a coupling site; the coupling site in the formula (1) is bonded to a carbon atom of the oxadiazole skeleton; and in the coupling sites in the formula (2), the left end is bonded to the oxadiazole skeleton, and the right end is bonded to the benzene skeleton or the pyridine skeleton, in a proportion of from 0.01 to 5% by weight in a total amount of the ultraviolet-curable adhesive, with the remainder being composed of ultraviolet-curable adhesive components other than the compound (A).

31. The ultraviolet-curable adhesive according to claim 30, wherein the compound (A) represented by the formula (1) is at least one compound selected from the group consisting of 2-(4-biphenyl)-5-(4-tert-butylphenyl)-1,3,4-oxadiazole, 1,3-bis[2-(2,2'-bipyridin-6-yl)-1,3,4-oxadiazo-5-yl]benzene, 6,6'-bis[5-(biphenyl-4-yl)-1,3,4-oxadiazo-2-yl]-2,2'-bipyridyl, and 1,3-bis[2-(4-tert-butylphenyl)-1,3,4-oxadiazo-5-yl]benzene.

32. The ultraviolet-curable adhesive according to claim 30, which contains, as the ultraviolet-curable adhesive components other than the compound (A),
(B) a photopolymerizable compound,
(C) a photopolymerization initiator,
(D) a softening component and which contains, as the photopolymerizable compound (B), (i) (B-1-1) at least one (meth)acrylate oligomer selected from the group consisting of: a urethane (meth)acrylate oligomer; and a (meth)acrylate oligomer having at least one skeleton of a polyisoprene skeleton and a polybutadiene skeleton and (ii) (B-1-2) a monofunctional (meth)acrylate monomer, wherein a content of the (meth)acrylate oligomer (B-1-1) is from 5 to 90% by weight, a content of the monofunctional (meth)acrylate monomer (B-1-2) is from 5 to 70% by weight, a content of the photopolymerization initiator (C) is from 0.01 to 5% by weight, and a content of the softening component (D) is from 10 to 80% by weight in a total amount of the ultraviolet-curable adhesive, the ultraviolet-curable adhesive being used for laminating an optical base material and an optical base material having a light-shielding portion on a surface thereof to each other.

33. The ultraviolet-curable adhesive according to claim 23, which contains, as other component, (D) a softening component.

* * * * *